US012434604B2

(12) United States Patent
Carroll et al.

(10) Patent No.: US 12,434,604 B2
(45) Date of Patent: Oct. 7, 2025

(54) LOCKING ASSEMBLY FOR RECLINER

(71) Applicant: Camaco, LLC, Farmington Hills, MI (US)

(72) Inventors: Jeff Carroll, West Bloomfield, MI (US); Sanjay Vakil, Troy, MI (US); Mohammad Fazli, Farmington Hills, MI (US); Yang Cao, Troy, MI (US); Harish Bijwe, Novi, MI (US)

(73) Assignee: CAMACO, LLC., Farmington Hills, MI (US)

( * ) Notice: Subject to any disclaimer, the term of this patent is extended or adjusted under 35 U.S.C. 154(b) by 0 days.

(21) Appl. No.: 18/630,649

(22) Filed: Apr. 9, 2024

(65) Prior Publication Data
US 2024/0253538 A1   Aug. 1, 2024

Related U.S. Application Data

(63) Continuation of application No. 18/345,881, filed on Jun. 30, 2023, now Pat. No. 11,975,638.
(Continued)

(51) Int. Cl.
*B60N 2/235* (2006.01)
*B60N 2/02* (2006.01)
*B60N 2/12* (2006.01)

(52) U.S. Cl.
CPC ....... *B60N 2/2356* (2013.01); *B60N 2/02246* (2023.08); *B60N 2/12* (2013.01); *B60N 2/236* (2015.04); *B60N 2/2362* (2015.04)

(58) Field of Classification Search
CPC ................................ B60N 2/2356; B60N 2/12
See application file for complete search history.

(56) References Cited

U.S. PATENT DOCUMENTS

| 5,328,241 A | 7/1994 | Haider |
| 7,360,838 B2 * | 4/2008 | Smuk ..................... B60N 2/236 |
| | | 297/367 R |

(Continued)

FOREIGN PATENT DOCUMENTS

| FR | 2998228 A1 | 5/2014 |
| GB | 2 451 981 | 10/2016 |
| WO | WO-2020/218589 A1 | 10/2020 |

OTHER PUBLICATIONS

International Search Report and Written Opinion issued in connection with PCT Appl. No. PCT/US2023/026774 dated Sep. 29, 2023.
(Continued)

*Primary Examiner* — Anthony D Barfield
(74) *Attorney, Agent, or Firm* — FOLEY & LARDNER LLP

(57) ABSTRACT

A locking mechanism includes a plate and a pawl. The plate includes a peripheral lip having an interior face that defines a plurality of teeth. The pawl defines a central axis and includes a plurality of pawl teeth including a first middle tooth and a second middle tooth. The first middle tooth is positioned on a first side of the central axis and has a first flat face facing the central axis and a first curved face facing away from the central axis. The second middle tooth is positioned on an opposing second side of the central axis and has a second flat face facing the central axis and a second curved face facing away from the central axis. The pawl is positionable between (i) a first position where the pawl does not engage with the plate and (ii) a second position where the pawl engages with the plate.

18 Claims, 32 Drawing Sheets

Related U.S. Application Data

(60) Provisional application No. 63/357,817, filed on Jul. 1, 2022, provisional application No. 63/357,813, filed on Jul. 1, 2022, provisional application No. 63/357,821, filed on Jul. 1, 2022, provisional application No. 63/357,856, filed on Jul. 1, 2022.

(56) References Cited

U.S. PATENT DOCUMENTS

| | | |
|---|---|---|
| 8,123,297 B2 | 2/2012 | Quast et al. |
| 8,720,999 B2 | 5/2014 | Peters |
| 8,827,368 B2 | 9/2014 | Leighton et al. |
| 8,870,287 B2 | 10/2014 | Yamada et al. |
| 9,242,583 B2 * | 1/2016 | Endou ................. B60N 2/2352 |
| 9,903,453 B2 | 2/2018 | Maeda et al. |
| 10,787,102 B2 | 9/2020 | Moulin |
| 10,793,030 B2 | 10/2020 | Maeda et al. |
| 2002/0096923 A1 | 7/2002 | Uramichi |
| 2003/0025376 A1 | 2/2003 | Moriyama et al. |
| 2006/0020253 A1 | 1/2006 | Prescott |
| 2006/0202537 A1 | 9/2006 | Smuk |
| 2007/0145801 A1 | 6/2007 | Yamada et al. |
| 2013/0113261 A1 | 5/2013 | Mikasa et al. |
| 2013/0264850 A1 | 10/2013 | Maeda |
| 2014/0225409 A1 | 8/2014 | Nagura et al. |
| 2014/0239691 A1 | 8/2014 | Hellrung |
| 2014/0284984 A1 | 9/2014 | Yamada et al. |
| 2015/0035339 A1 | 2/2015 | Endou et al. |
| 2016/0023577 A1 | 1/2016 | Yamada et al. |
| 2017/0203671 A1 | 7/2017 | Runde |
| 2019/0358694 A1 | 11/2019 | Yamakita |
| 2020/0231070 A1 | 7/2020 | Schmitz et al. |
| 2020/0282879 A1 | 9/2020 | Schmitz et al. |
| 2021/0068545 A1 | 3/2021 | Maeda et al. |
| 2022/0144150 A1 | 5/2022 | Teraguchi et al. |

OTHER PUBLICATIONS

International Search Report and Written Opinion issued in connection with PCT Appl. No. PCT/US2023/026776 dated Sep. 19, 2023.
International Search Report and Written Opinion issued in connection with PCT Appl. No. PCT/US2023/026777 dated Sep. 21, 2023.
International Search Report and Written Opinion issued in connection with PCT Appl. No. PCT/US2023/026779 dated Sep. 27, 2023.
Non-Final Office Action on U.S. Appl. No. 18/345,906 DTD Nov. 17, 2023.
Notice of Allowance on U.S. Appl. No. 18/345,881 DTD Jan. 9, 2024.
Notice of Allowance on U.S. Appl. No. 18/345,906 DTD Feb. 27, 2024.
International Preliminary Report on Patentability issued in connection with PCT Appl. No. PCT/US2023/026774 dated Dec. 18, 2024.
International Preliminary Report on Patentability issued in connection with PCT Appl. No. PCT/US2023/026776 dated Dec. 18, 2024.
International Preliminary Report on Patentability issued in connection with PCT Appl. No. PCT/US2023/026777 dated Dec. 18, 2024.
International Preliminary Report on Patentability issued in connection with PCT Appl. No. PCT/US2023/026779 dated Dec. 18, 2024.

* cited by examiner

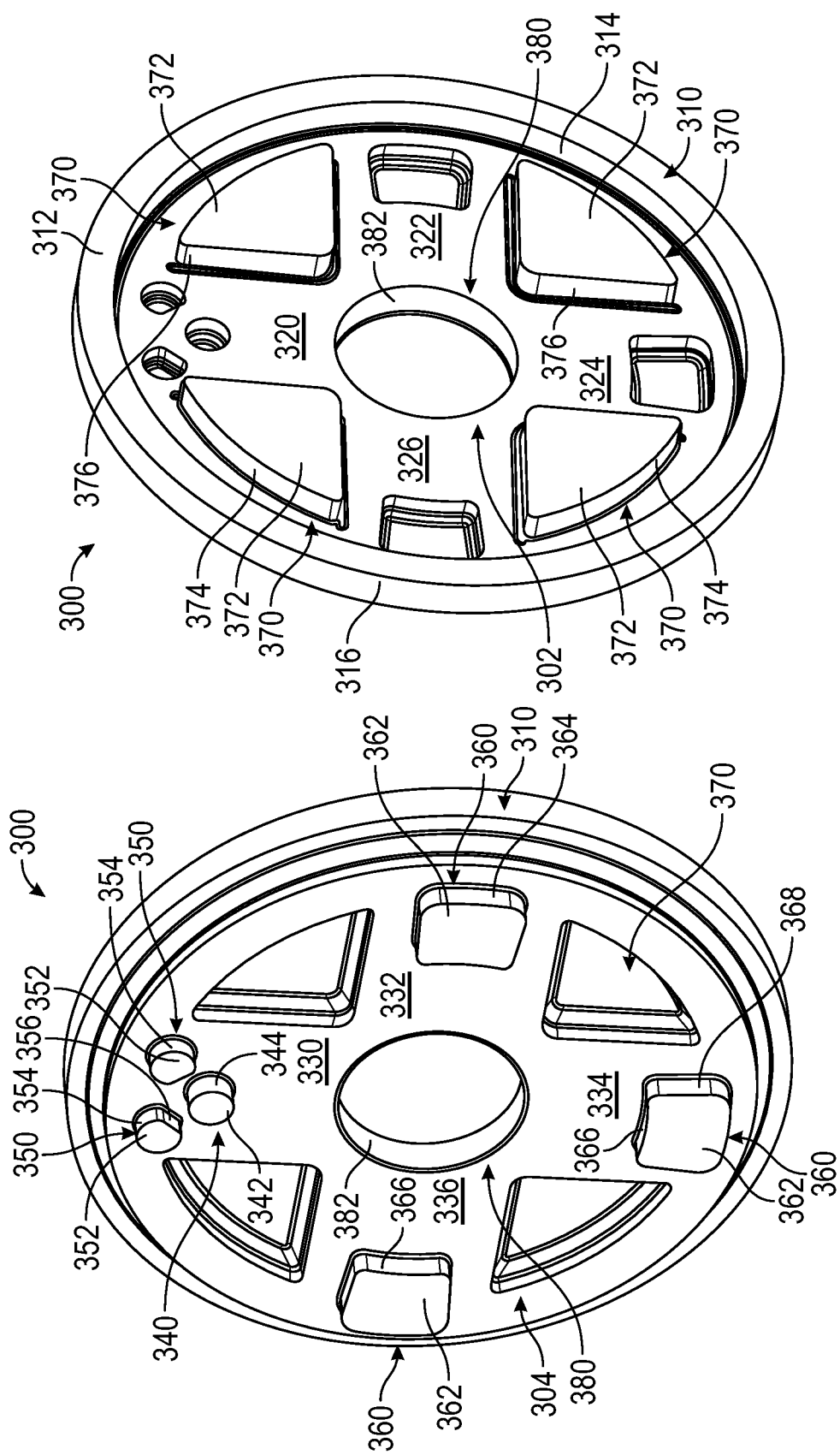

LOCKING ASSEMBLY FOR RECLINER

CROSS-REFERENCE TO RELATED PATENT APPLICATIONS

This application is a continuation of U.S. patent application Ser. No. 18/345,881, filed Jun. 30, 2023, U.S. Pat. No. 11,975,638, which claims the benefit of and priority to (a) U.S. Provisional Patent Application No. 63/357,813, filed Jul. 1, 2022, (b) U.S. Provisional Patent Application No. 63/357,817, filed Jul. 1, 2022, (c) U.S. Provisional Patent Application No. 63/357,821, filed Jul. 1, 2022, and (d) U.S. Provisional Patent Application No. 63/357,856, filed Jul. 1, 2022, all of which are incorporated herein by reference in their entireties.

BACKGROUND

A typical vehicle includes a cabin that has a seat assembly that accommodates and supports an occupant. The seat assembly includes an upper frame, a lower frame, and a locking system that secures the upper frame to the lower frame. The locking system may facilitate repositioning of the upper frame relative to the lower frame (i.e., bring up or bring down (recline) the seat).

SUMMARY

One embodiment relates to a locking mechanism for a recliner assembly. The locking mechanism includes a plate and a pawl. The plate includes a peripheral lip having an interior face that defines a plurality of teeth. The pawl defines a central axis and includes a plurality of pawl teeth. The plurality of pawl teeth include a first middle tooth and a second middle tooth. The first middle tooth is positioned on a first side of the central axis. The first middle tooth has a first flat face facing the central axis and a first curved face facing away from the central axis. The second middle tooth is positioned on an opposing second side of the central axis. The second middle tooth has a second flat face facing the central axis and a second curved face facing away from the central axis. The pawl is positionable between (i) a first position where the pawl does not engage with the plate and (ii) a second position where the pawl engages with the plate. Under first loading conditions and while the pawl is in the second position, the first flat face of the first middle tooth and the second flat face of the second middle tooth do not contact corresponding surfaces of the plurality of teeth of the plate.

Another embodiment relates to seat. The seat includes a frame assembly and a recliner assembly. The frame assembly includes a first frame portion and a second frame portion. The recliner assembly configured to facilitate pivoting of the first frame portion relative to the second frame portion. The recliner assembly includes a connecting shaft and at least one locking mechanism coupled to the connecting shaft. The connecting shaft extends between the first frame portion and the second frame portion. The at least one locking mechanism includes a plate and a pawl. The plate includes a peripheral lip having an interior face that defines a plurality of teeth. The pawl has a plurality of pawl teeth. The plurality of pawl teeth include a first middle tooth positioned on a first side of a central axis of the pawl and a second middle tooth positioned on an opposing second side of the central axis. The first middle tooth has a first flat face facing the central axis and a first curved face facing away from the central axis. The second middle tooth has a second flat face facing the central axis and a second curved face facing away from the central axis. The pawl is positionable between (i) a first position where the pawl does not engage with the plate and (ii) a second position where the pawl engages with the plate.

Another embodiment relates to locking mechanism for a recliner assembly. The locking mechanism includes a housing and a pawl. The housing has an interior surface that defines a plurality of teeth. The pawl has a plurality of pawl teeth. The plurality of pawl teeth include a first middle tooth positioned on a first side of a central axis of the pawl and a second middle tooth positioned on an opposing second side of the central axis. The first middle tooth has a first flat face facing the central axis and a first curved face facing away from the central axis. The second middle tooth has a second flat face facing the central axis and a second curved face facing away from the central axis. The pawl is positionable between (i) a first position where the pawl does not engage with the interior surface and (ii) a second position where the pawl engages with the interior surface.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIGS. 10 and 11 are various perspective views of the guide plate of FIGS. 8 and 9, according to an exemplary embodiment.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Vehicle and Passenger Cabin

Figure 1:
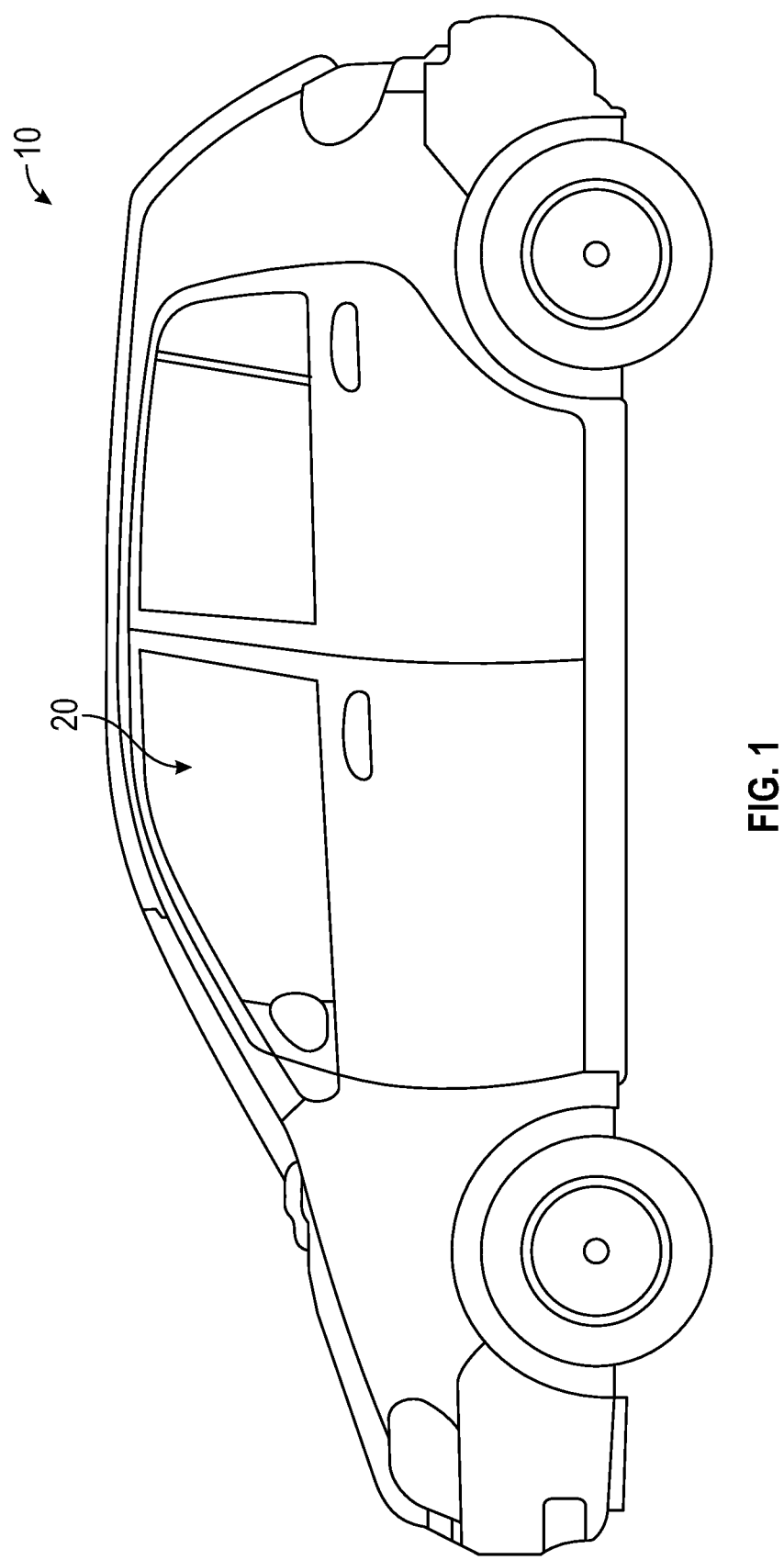
FIG. 1 is a side view of a vehicle, according to an exemplary embodiment.
Figure 2:
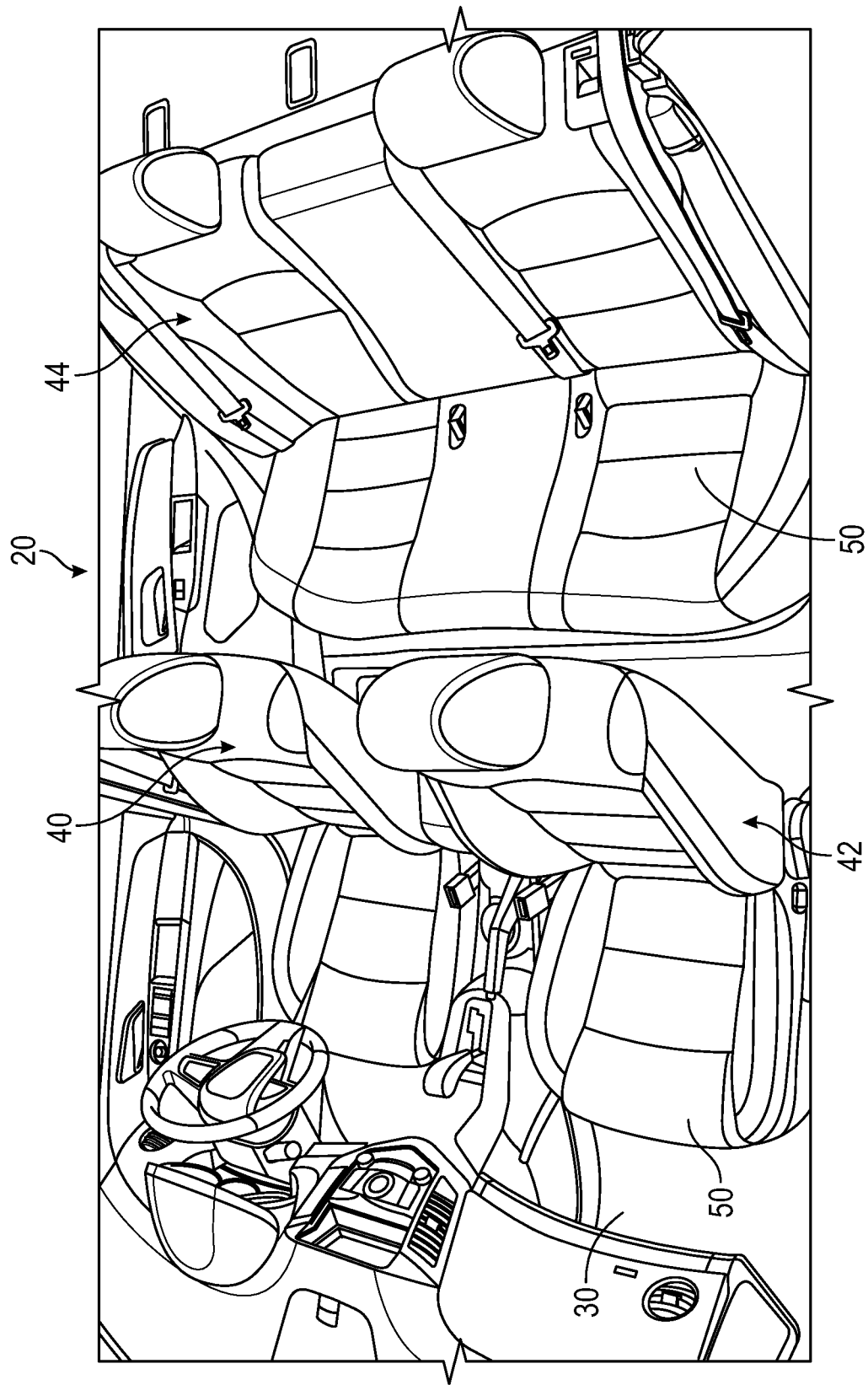
FIG. 2 is a perspective view of a cabin of the vehicle of FIG. 1 including a seat, according to an exemplary embodiment.

As shown in FIGS. 1 and 2, a vehicle 10 includes an interior cabin, shown as passenger cabin 20. In one embodiment, the vehicle 10 is configured as an on-road vehicle such as a sedan, a sport utility vehicle ("SUV"), a pickup truck, a van, and/or still another type of passenger vehicle. In other embodiments, the vehicle 10 is configured as another type of on-road vehicle such as a semi-truck, a bus, or the like. In still other embodiments, the vehicle 10 is configured as an off-road vehicle such as construction machinery, farming machinery, or the like.

As shown in FIG. 2, the passenger cabin 20 includes a support surface, shown as cabin floor 30, that supports one or more seating assemblies, shown as seats 40, including one or more first seating assemblies, shown as front seats 42, and one or more second seating assemblies, shown as rear seats 44. In some embodiments, the front seats 42 are different than the rear seats 44 (e.g., the front seats 42 recline while the rear seats 44 do not recline). In other embodiments, the front seats 42 and the rear seats 44 are the same or utilize similar components (e.g., to facilitate increased scaling for manufacturing and, therefore, a reduction in production costs). By way of example, the front seats 42 and the rear seats 44 may utilize the same or similar reclining mechanisms. By way of another example, the front seats 42 and the rear seats 44 may utilize a similar track assembly, however, the track assembly for one of the front seats 42 or the rear seats 44 may include one or more additional components (e.g., for added strength, to meet or exceed industry standards, etc.). In some embodiments, the passenger cabin 20 does not include the rear seats 44. In some embodiments, the passenger cabin 20 only includes a single front seat 42.

Seat Assembly

Figure 3:
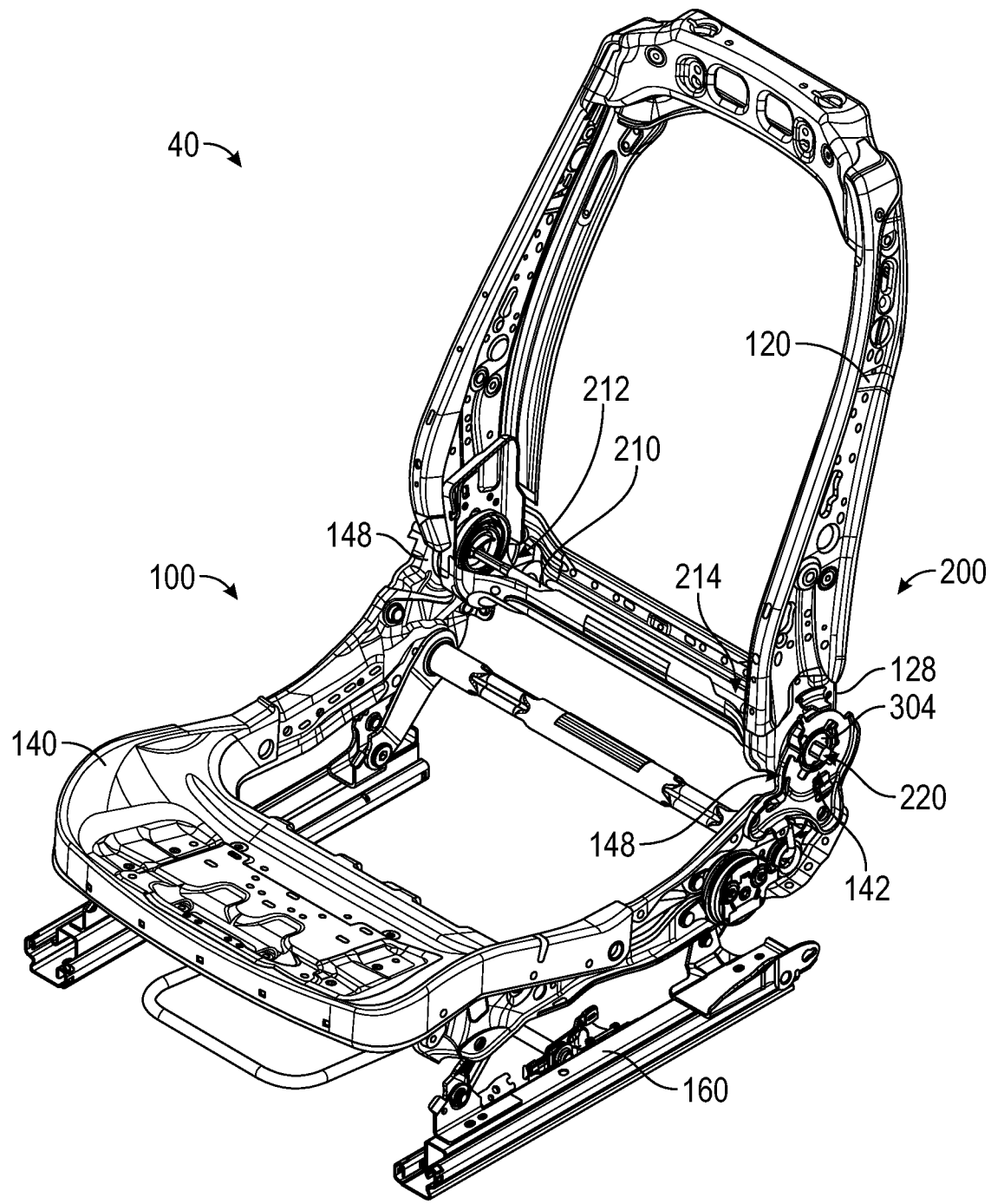
FIG. 3 is a perspective view of a frame assembly of the seat of FIG. 2 including a seat frame assembly, a recliner assembly, and locking mechanisms, according to an exemplary embodiment.

As shown in FIGS. 2 and 3, each of the seats 40 includes a plurality of padded components (e.g., a seat back pad or cushion, a seat bottom pad or cushion, etc.), shown as seat cushions 50, and a framing assembly, shown as frame assembly 100. As shown in FIG. 3, the frame assembly 100 includes (i) a first frame portion, shown as upper frame 120, configured to support an upper portion of the seat cushions 50, (ii) a second frame portion, shown as lower frame 140, configured to support a lower portion of the seat cushions 50, (iii) a rail portion, shown as track assembly 160, configured to support and couple to the lower frame 140 and, thereby, couple the seat 40 to the cabin floor 30, and (iv) a pivoting coupler or reclining mechanism, shown as recliner assembly 200, configured to couple the upper frame 120 to the lower frame 140 and facilitate pivoting of the upper frame 120 relative to the lower frame 140 (i.e., reclining the seat 40) between a first, upright position and one or more second, pivoted or reclined positions. According to an exemplary embodiment, the track assembly 160 is adjustable (e.g., manually adjustable, electronically adjustable, etc.) such that the position of the seat 40 can be selectively adjusted (e.g., the seat 40 can be slid forward, rearward, etc.).

Figure 4:
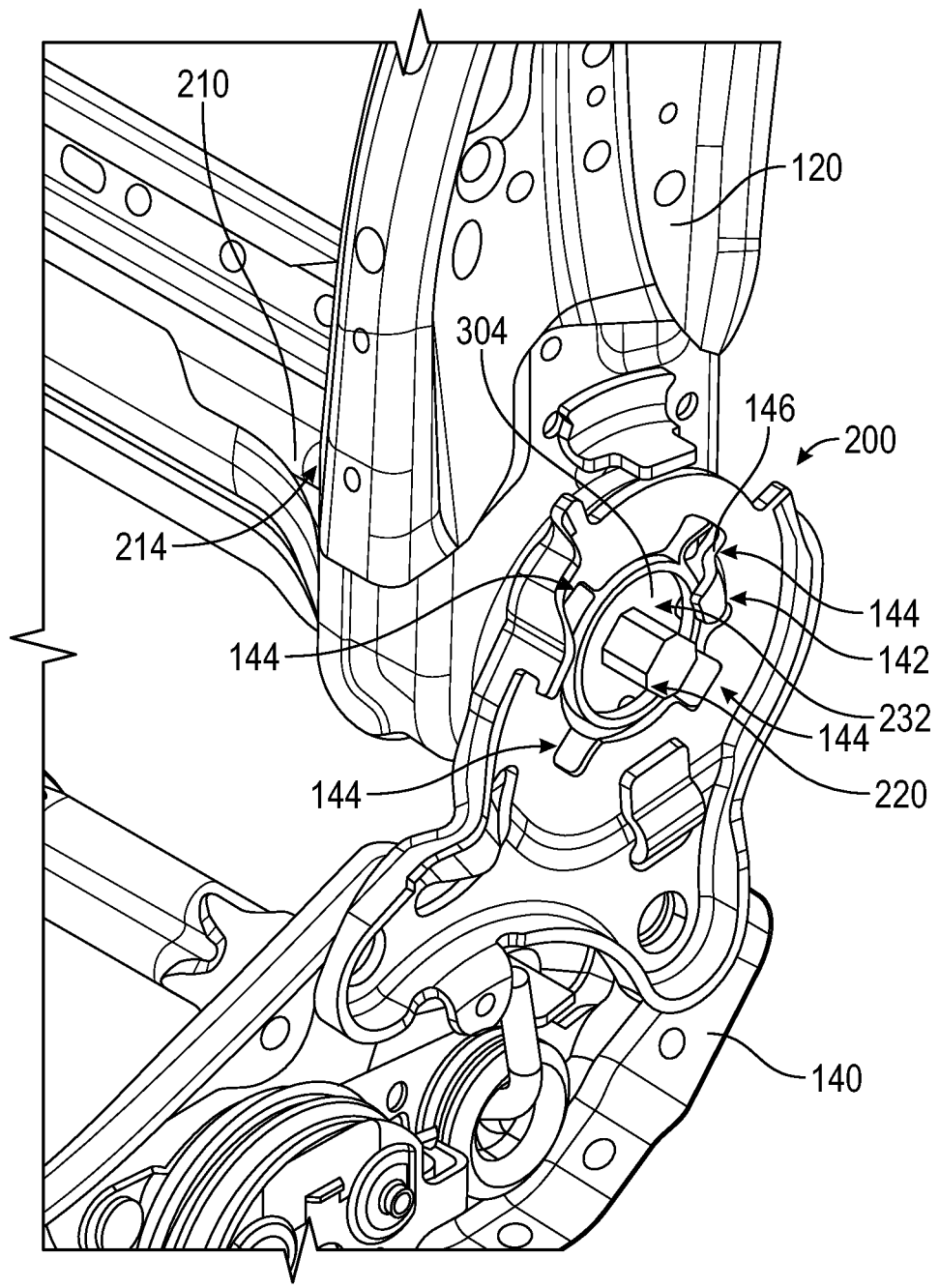
FIG. 4 is a partial perspective view of the seat frame assembly of FIG. 3 including the recliner assembly and the locking mechanism, according to an exemplary embodiment.

As shown in FIGS. 3 and 4, (i) the lower frame 140 includes first interfaces, shown as lower interfaces 148, positioned at opposing sides of the lower frame 140 that define first coupling apertures, shown as lower main attachment apertures 142, and (ii) the upper frame 120 includes second interfaces, shown as upper interfaces 128, positioned at opposing sides of the upper frame 120. According to an exemplary embodiment, the upper interfaces 128 of the upper frame 120 similarly define coupling apertures or upper main attachment apertures that align and interface with the lower main attachment apertures 142. As shown in FIGS. 3 and 4, the width of the upper frame 120 is less than the width of the lower frame 140 such that the upper interfaces 128 of the upper frame 120 are received between the lower interfaces 148 of the lower frame 140. In other embodiments, the width of the upper frame 120 is greater than the width of the lower frame 140 such that the lower interfaces 148 of the lower frame 140 are received between the upper interfaces 128 of the upper frame 120.

Recliner Assembly

Figure 5:
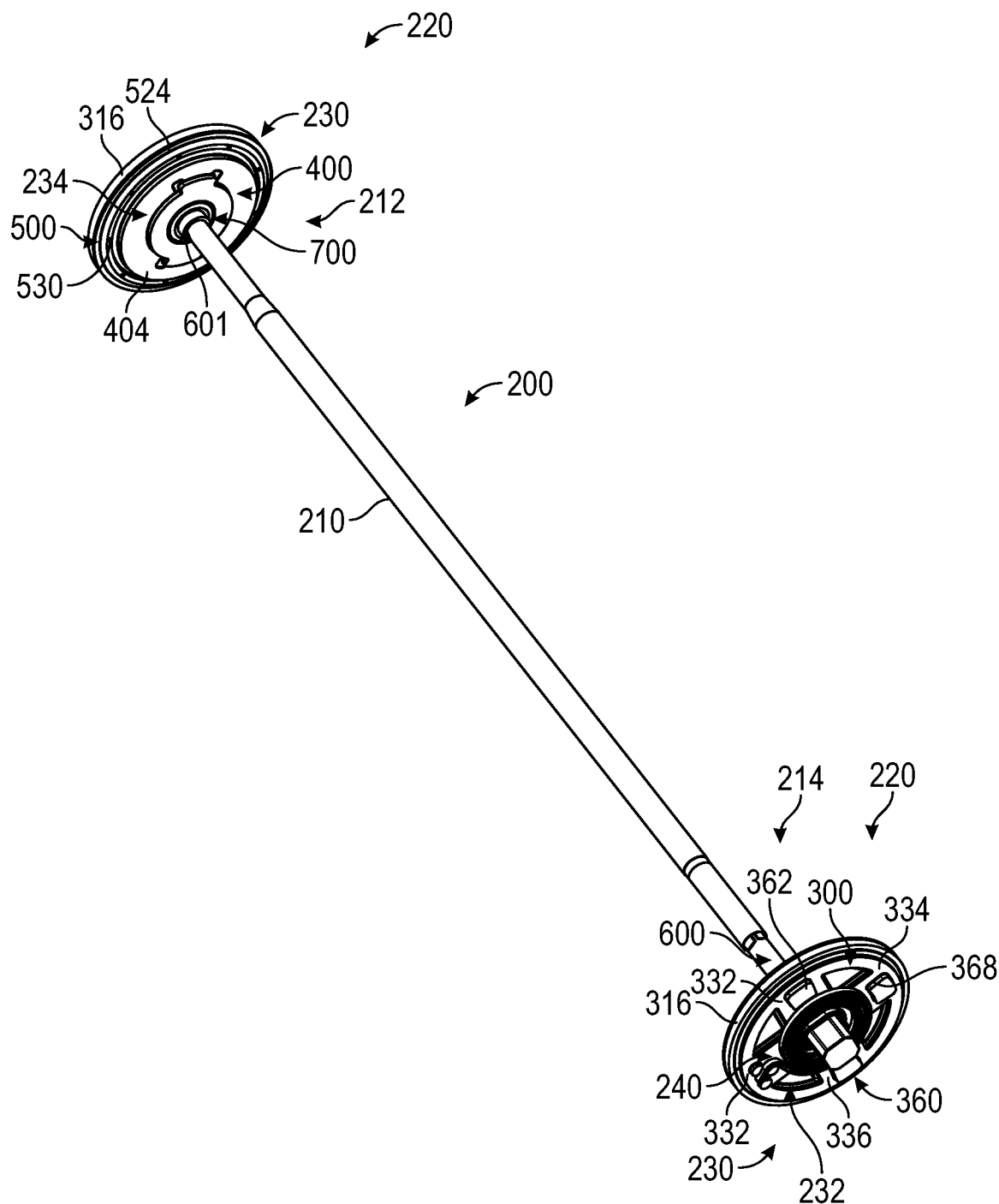
FIG. 5 is a perspective view of the recliner assembly of FIGS. 3 and 4, according to an exemplary embodiment.
Figure 6:
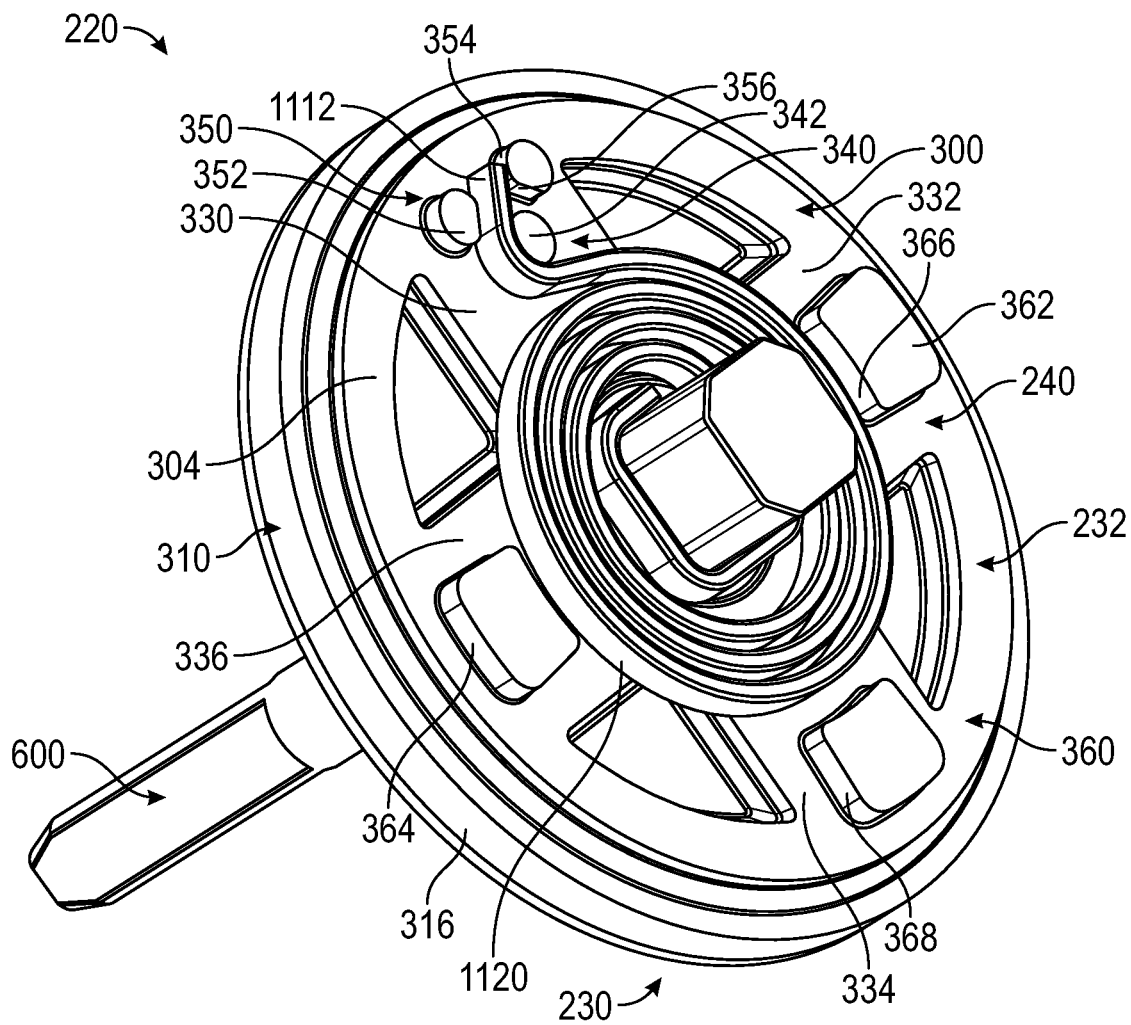
FIGS. 6 and 7 are various perspective views of the locking mechanism of FIGS. 3 and 4 including a locking mechanism housing and locking mechanism assembly, according to an exemplary embodiment.
Figure 7:
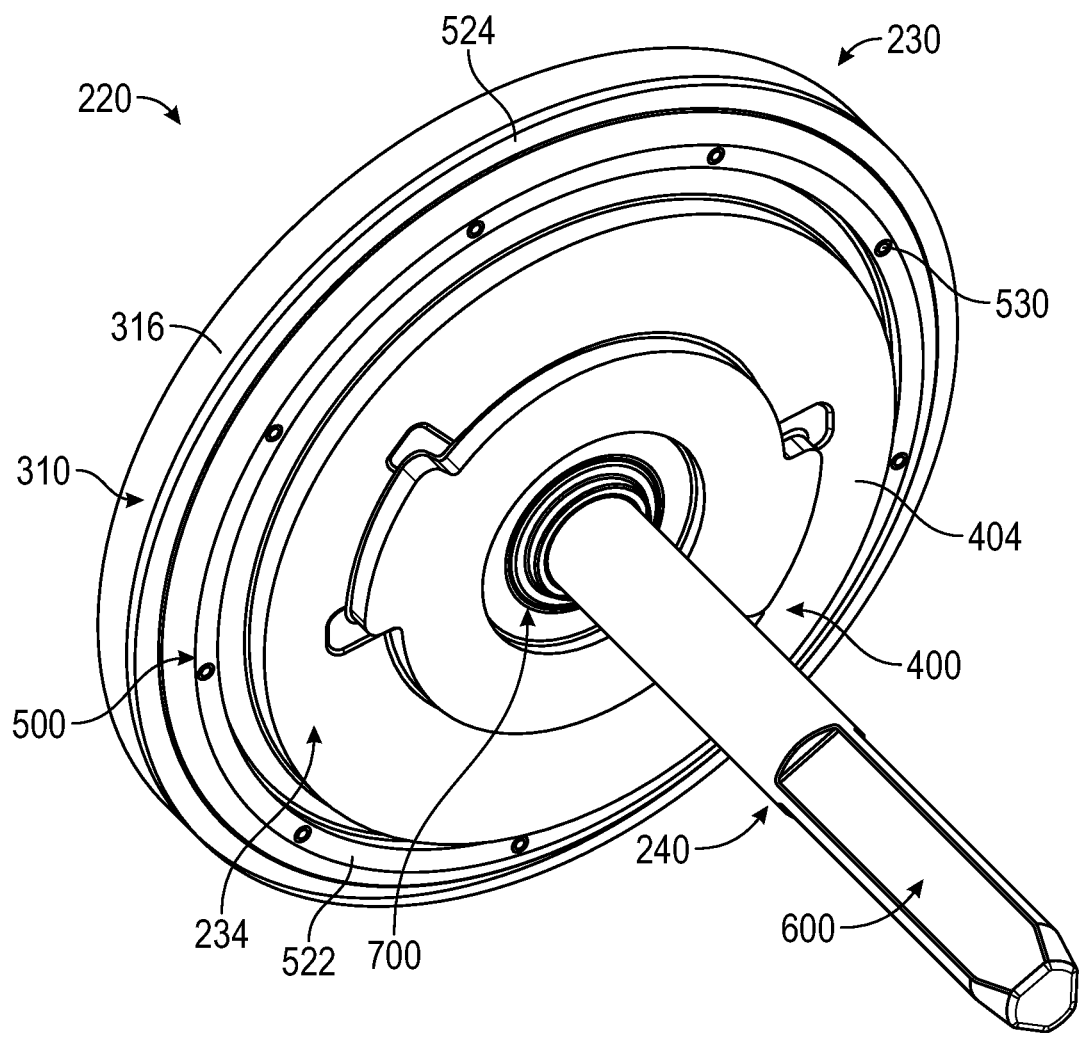

As shown in FIGS. 2 and 3, the recliner assembly 200 includes two locking assemblies, shown as locking mechanisms 220, and a shaft, shown as connecting shaft 210, that extends between and couples the locking mechanisms 220 to each other. According to an exemplary embodiment, the locking mechanisms 220 engage with the lower interfaces 148 of the lower frame 140 and the upper interfaces 128 of the upper frame 120 to pivotably couple the lower frame 140 and the upper frame 120 together. As shown in FIGS. 5-7, the locking mechanism 220 includes an outer casing or housing assembly, shown as housing 230, and a component assembly, shown as locking assembly 240. The housing 230 has a first side, shown as exterior side 232, and an opposing second side, shown as interior side 234. As shown in FIGS. 3 and 4, the locking mechanisms 220 are coupled to the lower frame 140 such that the exterior sides 232 of the housings 230 engage and are in contact with the inner face of the lower interfaces 148 of the lower frame 140. According to an exemplary embodiment, the locking mechanisms 220 are coupled to the upper frame 120 such that the interior sides 234 of the housings 230 engage and are in contact with the exterior face of the upper interfaces 128 of the upper frame 120. The housings 230 of the locking mechanisms 220 may, therefore, be positioned between the upper interface 128 of the upper frame 120 and the lower interfaces 148 of the lower frame 140.

As shown in FIGS. 5-9, the housing 230 includes a first housing portion or track plate, shown as guide plate 300, a second housing portion or a gear plate, shown as tooth plate 400, and a securing component or disk, shown as retaining ring 500. According to an exemplary embodiment, the guide plate 300, the tooth plate 400, and the retaining ring 500 engage with each other and couple together to form the housing 230 (e.g., the retaining ring 500 interfaces with the guide plate 300 and the retaining ring 500 secures the tooth plate 400 at least partially within the guide plate 300). In some embodiments, the retaining ring 500 is welded to the guide plate 300. In other embodiments, the retaining ring 500 interfaces with the guide plate 300 via fasteners (e.g., bolts, screws, rivets, etc.).

Figure 8:
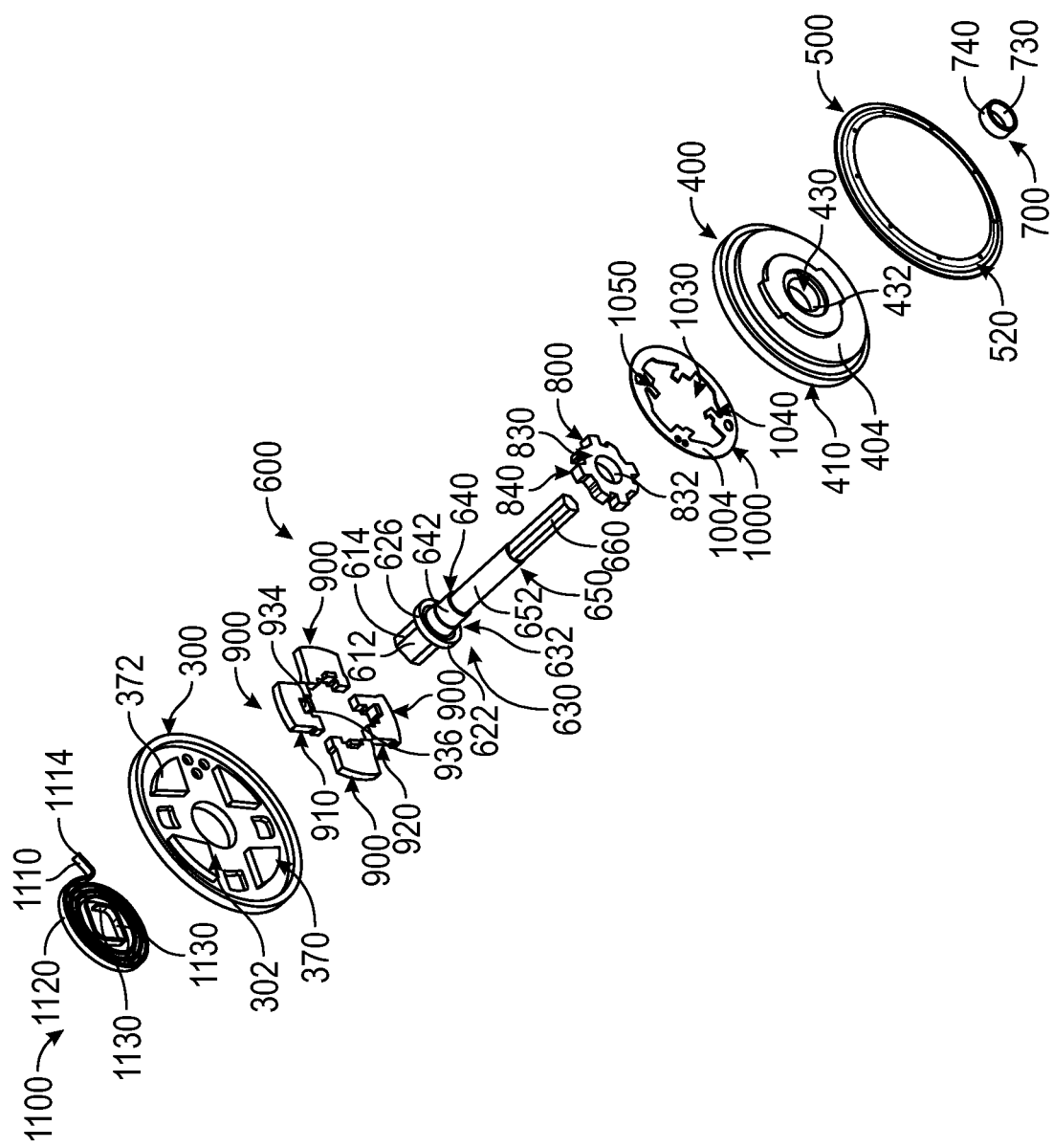
FIG. 8 is an exploded view of the locking mechanism of FIGS. 6 and 7 including a guide plate, a tooth plate, a retaining ring, a shaft, a shaft bushing, a cam, pawls, a release plate, and a spring, according to an exemplary embodiment.
Figure 9:
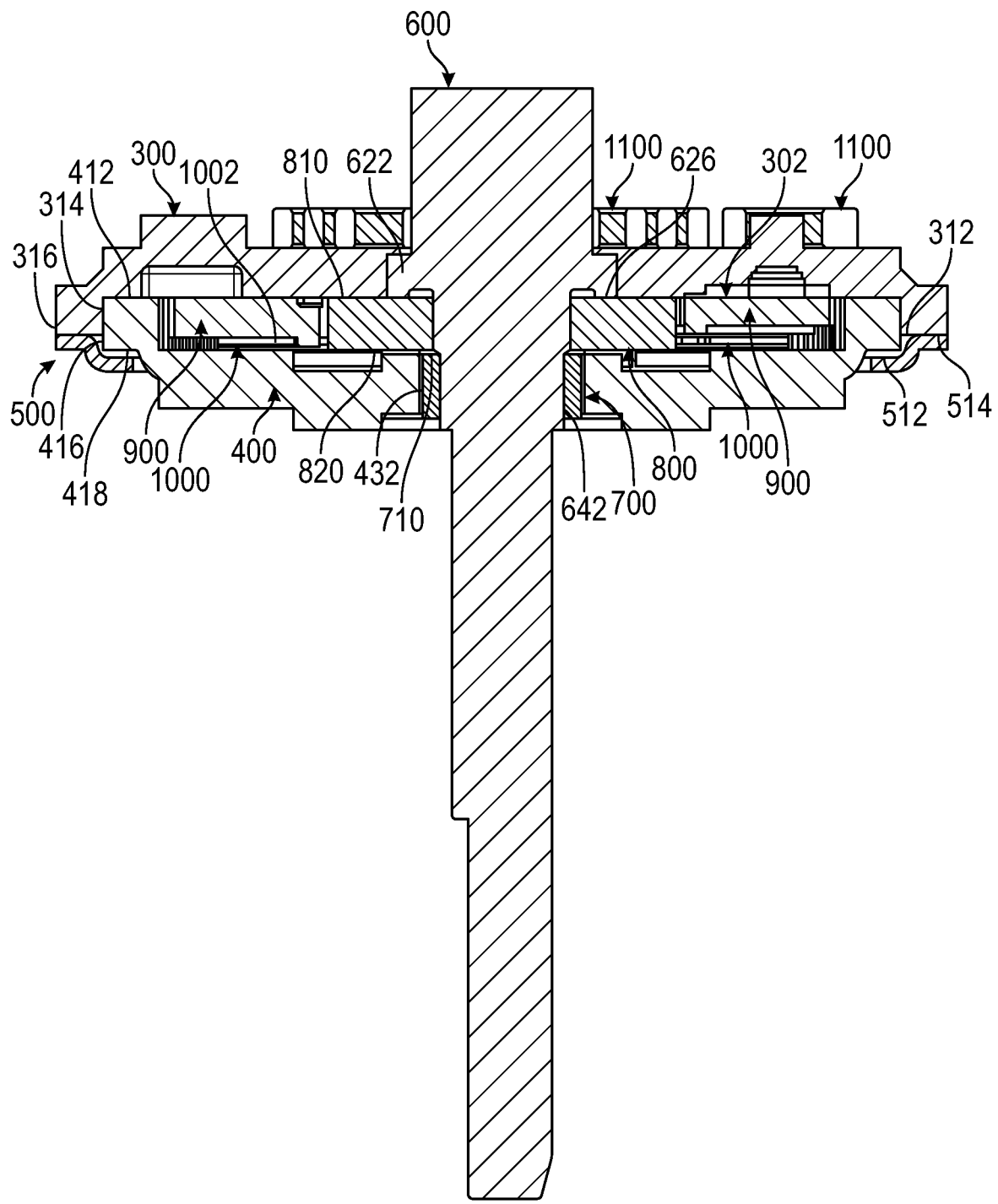
FIG. 9 is a cross-sectional view of the locking mechanism of FIGS. 6 and 7, according to an exemplary embodiment.

As shown in FIGS. 5-9, the locking assembly 240 includes a main shaft, shown as shaft 600, a bushing, shown as shaft bushing 700, a lobed ring, shown as cam 800, locking components or gears, shown as pawls 900, a retaining disk or plate, shown as release plate 1000, and a biasing or resilient element, shown as spring 1100 (e.g., a torsion spring). As shown in FIG. 9, (i) the shaft 600 extends through the housing 230, (ii) the shaft bushing 700 is coupled to the shaft 600 and at least partially disposed within the housing 230 and in engagement with a portion of the tooth plate 400 (e.g., a through-hole defined therein) such that the shaft 600 is rotatable relative to the housing 230, (iii) the cam 800 is coupled to/along the shaft 600 and disposed within the housing 230, (iv) the pawls 900 and the release plate 1000 are disposed within the housing 230 and in engagement with the cam 800, and (v) the spring 1100 is coupled to the guide plate 300 and the shaft 600 and positioned outside of the housing 230. In other embodiments, the spring 1100 is at least partially disposed within the housing 230. According to an exemplary embodiment, the shaft 600, the shaft bushing 700, the cam 800, the release plate 1000, and the spring 1100 are (i) prevented from rotating when the locking mechanism 220 is in a locked orientation and (ii) permitted to rotate when the locking mechanism 220 is in an unlocked orientation. Further details regarding the relationship and interactions between the various components of the locking mechanisms 220 are provided in greater detail herein.

Housing

Figure 13:
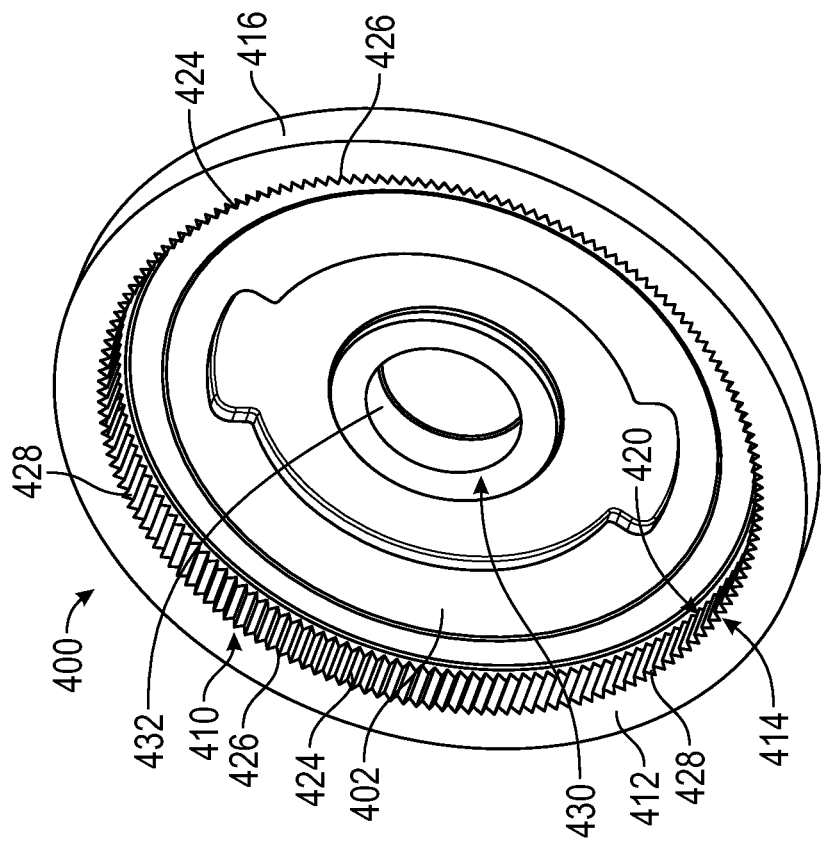
FIGS. 12 and 13 are various perspective views of the tooth plate of FIGS. 8 and 9, according to an exemplary embodiment.
Figure 12:
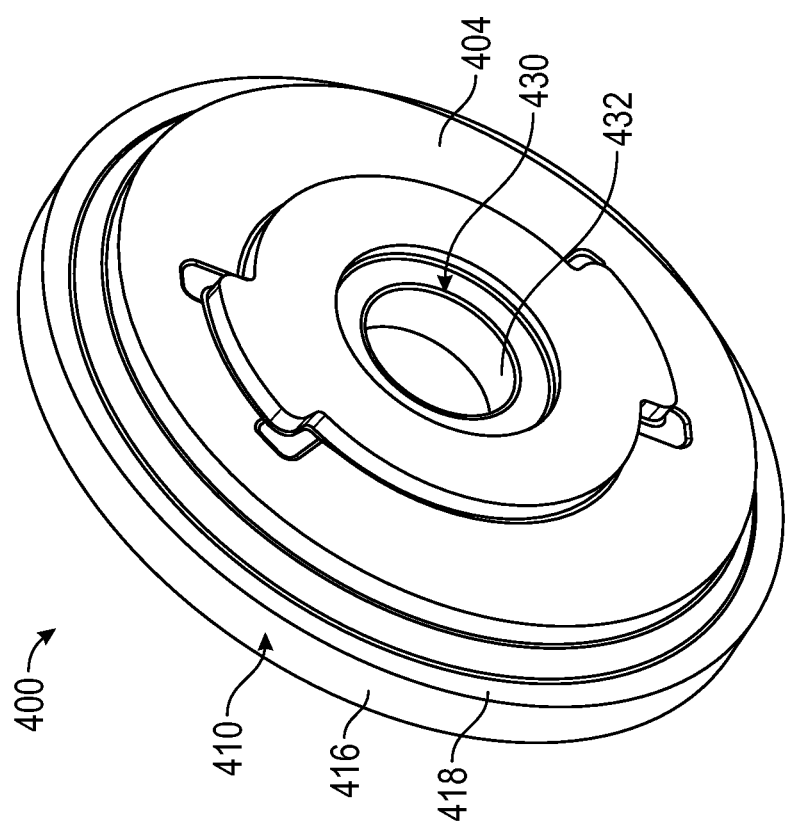

As shown in FIGS. 10 and 11, the guide plate 300 has a first surface, shown as inner face 302, and an opposing second surface, shown as outer face 304. The guide plate 300 includes a peripheral lip, shown as flange 310, that extends from the inner face 302 of the guide plate 300 and terminates with a flat surface, shown as interior lip face 312. The flange 310 of the guide plate 300 includes an inner surface, shown as inner wall 314, and an outer surface, shown as outer wall 316. As shown in FIGS. 12 and 13, the tooth plate 400 has a first surface, shown as inner face 402, and an opposing second surface, shown as outer face 404.

The tooth plate 400 includes a peripheral lip, shown as flange 410, that extends from the inner face 402 and terminates with a first flat surface, shown as interior lip face 412. The flange 410 includes an inner surface, shown as inner wall 414, an outer surface, shown as outer wall 416, and a second flat surface, shown as exterior lip face 418. As shown in FIG. 9, the guide plate 300 is coupled to the tooth plate 400 such that (i) the inner face 302 of the guide plate 300 faces the inner face 402 of the tooth plate 400, (ii) the interior lip face 412 of the flange 410 of the tooth plate 400 engages with the inner face 302 of the guide plate 300, and (iii) the outer wall 416 of the flange 410 of the tooth plate 400 engages with the inner wall 314 of the flange 310 of the guide plate 300. According to an exemplary embodiment, the guide plate 300 and tooth plate 400 can selectively rotate relative to each other.

Figure 14:
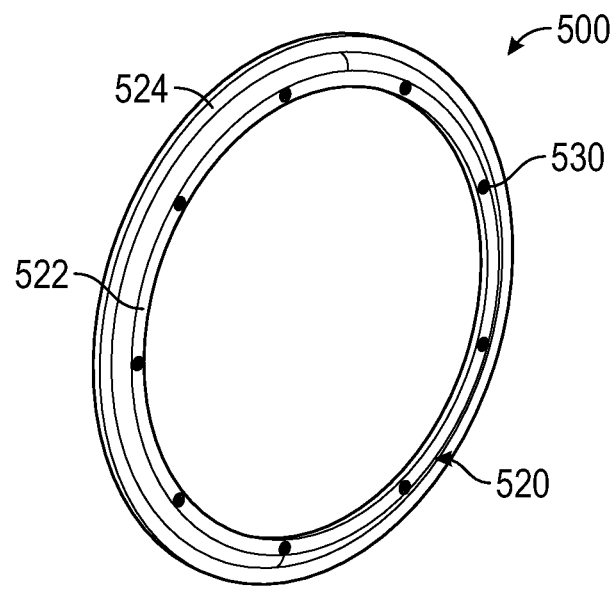
FIGS. 14 and 15 are various perspective views of the retaining ring of FIGS. 8 and 9, according to an exemplary embodiment.
Figure 15:
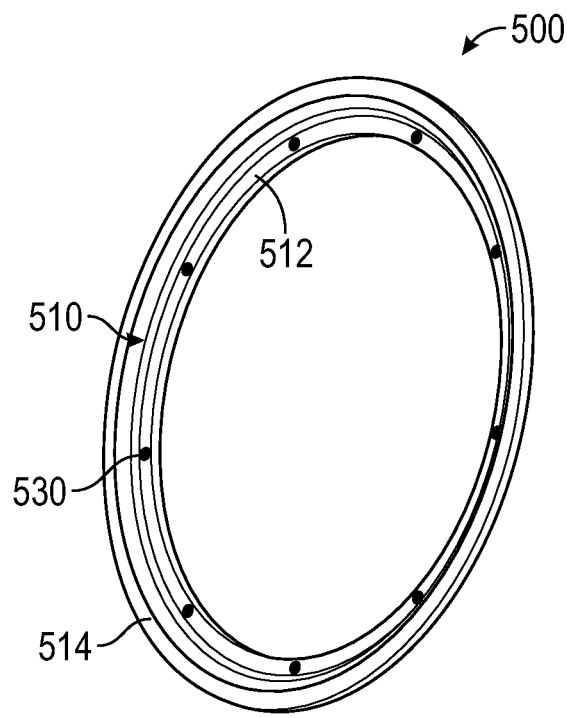

As shown in FIGS. 14 and 15, the retaining ring 500 has a first side, shown as inner side 510, and an opposing second side, shown as outer side 520. The inner side 510 includes a first sub-face, shown as first sub-inner face 512, and a second sub-face, shown as second sub-inner face 514, offset from the first sub-inner face 512 (e.g., a stepped profile) and extending around the periphery of the first sub-inner face 512. The outer side 520 includes a first sub-face, shown as first sub-outer face 522, and a second sub-face, shown as second sub-outer face 524.

As shown in FIG. 9, the retaining ring 500 is coupled to the guide plate 300 and the tooth plate 400 such that (i) the first sub-inner face 512 of the retaining ring 500 engages and is in contact with the exterior lip face 418 of the flange 410 of the tooth plate 400 and (ii) the second sub-inner face 514 of the retaining ring 500 engages and is in contact with the interior lip face 312 of the flange 310 of the guide plate 300, thereby securing the tooth plate 400 at least partially within the guide plate 300. According to an exemplary embodiment, the retaining ring 500 is coupled to the guide plate 300 such that the retaining ring 500 is fixed relative to the guide plate 300 (e.g., the retaining ring 500 is not fixed relative to the tooth plate 400). In some embodiments, the second sub-inner face 514 of the retaining ring 500 is fixedly coupled (e.g., welded, coupled using adhesive, etc.) to the interior lip face 312 of the flange 310 of the guide plate 300. In other embodiments, the second sub-inner face 514 of the retaining ring 500 is releasably coupled to the interior lip face 312 of the flange 310 of the guide plate 300 via fasteners (e.g., bolts, screws, rivets, etc.).

As shown in FIG. 10, the outer face 304 of the guide plate 300 includes a first section or area, shown as a first portion 330, a second section or area, shown as a second portion 332, a third section or area, shown as a third portion 334, and a fourth section or area, shown as a fourth portion 336. As shown in FIG. 11, the inner face 302 of the guide plate 300 includes a first section, channel, or area, shown as a first guide portion 320, a second section, channel, or area, shown as a second guide portion 322, a third section, channel, or area, shown as a third guide portion 324, and a fourth section, channel, or area, shown as fourth guide portion 326. As shown in FIGS. 10 and 11, (i) the first portion 330, the second portion 332, the third portion 334, and the fourth portion of the 336 of the outer face 304 and (ii) the first guide portion 320, the second guide portion 322, the third guide portion 324, and the fourth guide portion 326 are at least partially defined by a plurality of protrusions or guide elements, shown as guide tabs 370, variously positioned and spaced around the periphery of the inner face 302 and extending therefrom. More specifically, (i) a first one of the guide tabs 370 (a) extends inward from the outer face 304 of the guide plate 300 between the first portion 330 of the outer face 304 and the second portion 332 of the outer face 304, (b) extends outward from the inner face 302 of the guide plate 300 between the first guide portion 320 of the inner face 302 and the second guide portion 322 of the inner face 302, and (c) terminates with a flat surface, shown as outer face 372, (ii) a second one of the guide tabs 370 (a) extends inward from the outer face 304 between the second portion 332 of the outer face 304 and the third portion 334 of the outer face 304, (b) extends outward from the inner face 302 of the guide plate 300 between the second guide portion 322 of the inner face 302 and the third guide portion 324 of the inner face 302, and (c) terminates with the outer face 372, (iii) a third one of the guide tabs 370 (a) extends inward from the outer face 304 between the third portion 334 of the outer face 304 and the fourth portion 336 of the outer face 304, (b) extends outward from the inner face 302 of the guide plate 300 between the third guide portion 324 of the inner face 302 and the fourth guide portion 326 of the inner face 302, and (c) terminates with the outer face 372, and (iv) a fourth one of the guide tabs 370 (a) extends inward from the outer face 304 between the fourth portion 336 of the outer face 304 and the first portion 330 of the outer face 304, (b) extends outward from the inner face 302 of the guide plate 300 between the fourth guide portion 326 of the inner face 302 and the first guide portion 320 of the inner face 302, and (c) terminates with the outer face 372. Each of the guide tabs 370 include a curved surface, shown as curved face 374, positioned proximate the periphery of the guide plate 300 and two flat surfaces, shown as guide faces 376, extending perpendicular to each other and engaging the curved face 374. While described herein as including four guide tabs 370, in other embodiments, the guide plate 300 can include a different number of guide tabs 370 (e.g., two, three, five, six, etc.) and, therefore, a different number of the guide portions.

As shown in FIGS. 10 and 11, the guide plate 300 includes a spring retaining interface or spring retainer assembly that includes (i) a first protrusion or retainer, shown as circular tab 340, that (a) extends inward from the first guide portion 320 of the inner face 302 of the guide plate 300, (b) outward from the first portion 330 of the outer face 304 of the guide plate 300, and (c) terminates with a flat surface, shown as outer face 342, and (ii) a plurality of second protrusions or retainers, shown as semi-circular tabs 350, that (a) extend inward from the first guide portion 320 of the inner face 302 of the guide plate 300, (b) outward from the first portion 330 of the outer face 304 of the guide plate 300, and (c) terminate with flat surfaces, shown as outer faces 352. As shown in FIG. 10, the circular tab 340 has an outer peripheral wall or surface, shown as cylindrical face 344, while the semi-circular tabs 350 have an outer peripheral wall or surface that includes a first portion, shown as curved face 354, and a second portion, shown as flat face 356. The semi-circular tabs 350 are positioned such that the flat faces 356 are positioned adjacent and face the cylindrical face 344 of the circular tab 340.

As shown in FIG. 10, the spring retainer assembly of the guide plate 300 further includes a third plurality of protrusions or retainers, shown as securing tabs 360, variously positioned and spaced around the periphery of the outer face 304 and extending therefrom. More specifically, (i) a first one of the securing tabs 360 (a) extends inward from the second guide portion 322 of the inner face 302 of the guide plate 300, (b) outward from the second portion 332 of the outer face 304 of the guide plate 300, and (c) terminates with a flat surface, shown as outer face 362, (ii) a second one of the securing tabs 360 (a) extends inward from the third guide portion 324 of the inner face 302 of the guide plate 300, (b) outward from the third portion 334 of the outer face 304 of the guide plate 300, and (c) terminates with the outer face 362, and (iii) a third one of the securing tabs 360 (a) extends inward from the fourth guide portion 326 of the inner face 302 of the guide plate 300, (b) outward from the fourth portion 336 of the outer face 304 of the guide plate 300, and (c) terminates with the outer face 362. The securing tabs 360 include an outer peripheral wall or surface having a first portion, shown as outer face 364, positioned proximate the periphery of the guide plate 300, a second portion, shown as inner face 366, positioned opposite the outer face 364 and closer to the center of the guide plate 300, and third portions, shown as side faces 368, extending between the outer face 364 and the inner face 366. According to the exemplary embodiments shown in FIG. 10, the inner face 366 of the securing tab 360 is curved (e.g., to accommodate the spring 1100). While described herein as including three securing tabs 360, in other embodiments, the guide plate 300 can include a different number of securing tabs 360 (e.g., two, three, five, six, etc.; based on the number of the guide portions and guide tabs 370; etc.).

As shown in FIGS. 10 and 11, the guide plate 300 defines an interface or aperture, shown as shaft aperture 380, that has an inner surface, shown as inner face 382. As shown in FIG. 9, the shaft aperture 380 is configured to receive the shaft 600 such that a portion of the shaft 600 is in engagement with the inner face 382 of the shaft aperture 380, which is described in greater detail herein.

As shown in FIGS. 3 and 4, the lower main attachment apertures 142 of the lower frame 140 include a plurality of cutout interfaces, shown as notches 144, positioned along the periphery thereof. The notches 144 have a plurality of inner surfaces, shown as inner faces 146, that define the periphery thereof. The guide plate 300 is coupled to and engages the lower interface 148 of the lower frame 140 such that (i) the outer face 304 of the guide plate 300 engages with the interior surface of the lower interface 148, (ii) the securing tabs 360 of the guide plate 300 are received by a subset of the notches 144 such that the outer face 364 and the side faces 368 of the securing tabs 360 engage with the inner faces 146 of the subset of the notches 144, and (iii) the circular tab 340 and the semi-circular tabs 350 are received by one of the notches 144. The securing tabs 360 engage with the notches 144 such that the guide plate 300 is fixed relative to the lower interface 148 of the lower frame 140 and does not rotate relative to the lower frame 140. According to an exemplary embodiment, the lower main attachment aperture 142 of the lower frame 140 includes four notches 144. In other embodiments, the lower main attachment aperture 142 of the lower frame 140 includes more than four or less than four notches 144 (e.g., based on the number of securing tabs 360).

As shown in FIGS. 13, 29, 31, and 32, the inner wall 414 of the flange 410 of the tooth plate 400 defines a plurality of teeth, shown as teeth 420, that extend around the entire periphery thereof. Each tooth of the teeth 420 includes a first surface, shown as top land 424, a bottom surface, shown as bottom land 426, and two side surfaces, shown as side faces 428. According to an exemplary embodiment, all of the teeth 420 have the same pitch diameter. According to an exemplary embodiment, the side faces 428 of the teeth 420 of the tooth plate 400 are flat. As shown in FIGS. 12 and 13, the tooth plate 400 includes an interface or aperture, shown as shaft bushing aperture 430, that has an inner surface, shown as inner face 432. As shown in FIG. 9, the shaft bushing aperture 430 is configured to receive the shaft bushing 700 and the shaft 600 such that a portion of the shaft 600 is in engagement with shaft bushing 700 and the shaft bushing aperture 430, which is described in greater detail herein.

Shaft Bushing

Figure 20:
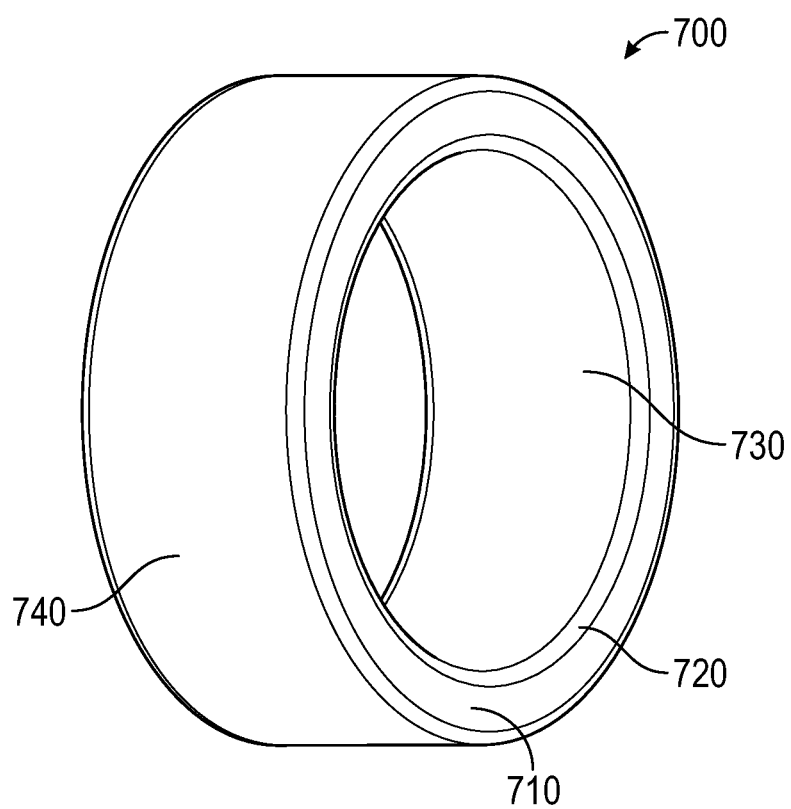
FIG. 20 is a perspective view of the shaft bushing of FIGS. 8 and 9, according to an exemplary embodiment.

As shown in FIGS. 9 and 20, the shaft bushing 700 has (i) outer peripheral walls, shown outer faces 710, that define an aperture or through-hole, shown as shaft aperture 720, (ii) an interior surface, inner face 730, and (iii) an exterior surface, shown as outer face 740. As shown in FIG. 9, the shaft bushing 700 is received by the shaft bushing aperture 430 of the tooth plate 400 such that the outer face 740 of the shaft bushing 700 interfaces with the inner face 432 of the shaft bushing aperture 430.

Shaft

As shown in FIGS. 8 and 16-19, the shaft 600 has a first end, shown as end 602, and an opposing second end, shown as end 604, that are spaced longitudinally apart. The shaft 600 includes an actuation interface, shown as end knob 610, positioned at the end 602. The end knob 610 has an outer profile (e.g., a keyed profile), shown as knob profile 612, that includes a plurality of flat surfaces, shown as side faces 614, that are angled relative to one another. In some embodiments, the knob profile 612 and/or the end knob 610 is configured to interface with an actuator (e.g., a hand lever) and/or provide a handgrip to facilitate manually engaging or disengaging the recliner assembly 200. In some embodiments, the knob profile 612 and/or the end knob 610 is configured to interface with an electric actuator (e.g., a motor) to facilitate electrically engaging or disengaging the recliner assembly 200. As shown in FIGS. 16-19, the shaft 600 includes a retainer, shown as shaft ring 620, that extends from the end knob 610 toward the end 604. The shaft ring 620 includes (i) an outer wall, shown as outer peripheral wall 622, (ii) a first face, shown as exterior face 624, in engagement with the end knob 610, and (iii) an opposing second face, shown as interior face 626. The outer peripheral wall 622 of the shaft ring 620 has a first diameter.

As shown in FIGS. 8 and 16-19, the shaft 600 includes (i) a first stepped portion, shown as cam interface 630, that extends from interior face 626 of the shaft ring 620, (ii) a second stepped portion, shown as bushing interface 640, extending from the cam interface 630, and (iii) a third stepped portion, shaft end portion 650, extending from the bushing interface 640. The cam interface 630 has (i) an outer surface, shown as outer face 632, and (ii) an end surface, shown as end face 636, from which the bushing interface 640 extends. The outer face 632 of the cam interface 630 has a second diameter that is less than the first diameter of the shaft ring 620. The bushing interface 640 has (i) an outer surface, shown as outer face 642, and (ii) an end surface, shown as end face 644, from which shaft end portion 650 extends. The outer face 642 of the bushing interface 640 has a third diameter that is less than the second diameter of the cam interface 630. The shaft end portion 650 extends from the end face 644 of the bushing interface 640. The shaft end portion 650 (i) has an outer surface, shown as outer face 652, and (ii) terminates with a retainer, shown as triangular key 660, and terminates at the end 604 of the shaft 600. The outer face 652 of the shaft end portion 650 has a fourth diameter that is less than the third diameter of the bushing interface 640.

Figure 16:
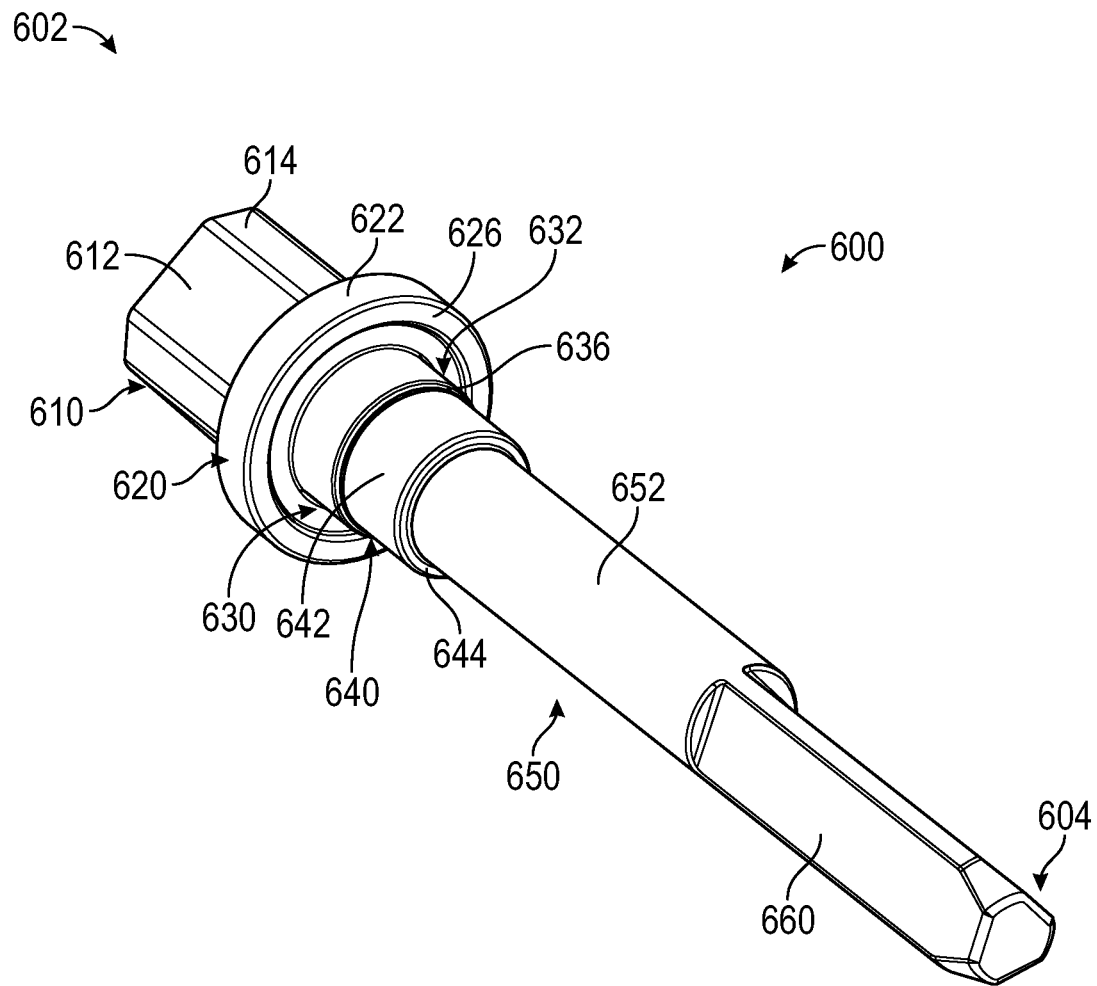
FIG. 16 is a perspective view of the shaft of FIGS. 8 and 9, according to an exemplary embodiment.
Figure 17:
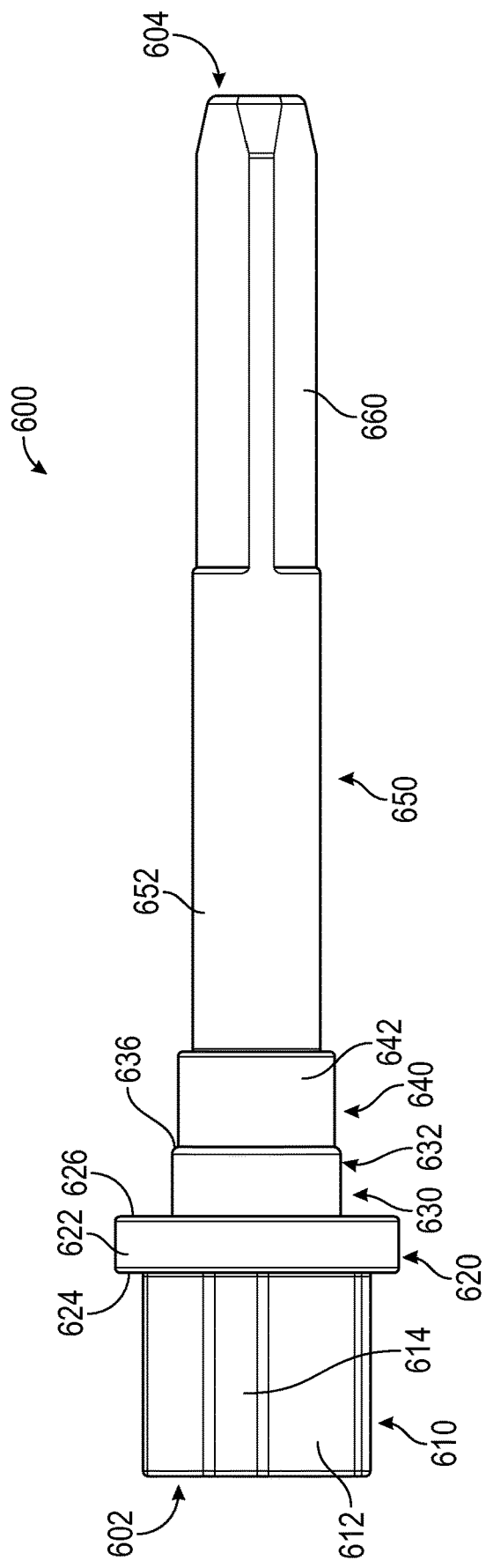
FIG. 17 is a side view of the shaft of FIG. 16, according to an exemplary embodiment.
Figure 18:
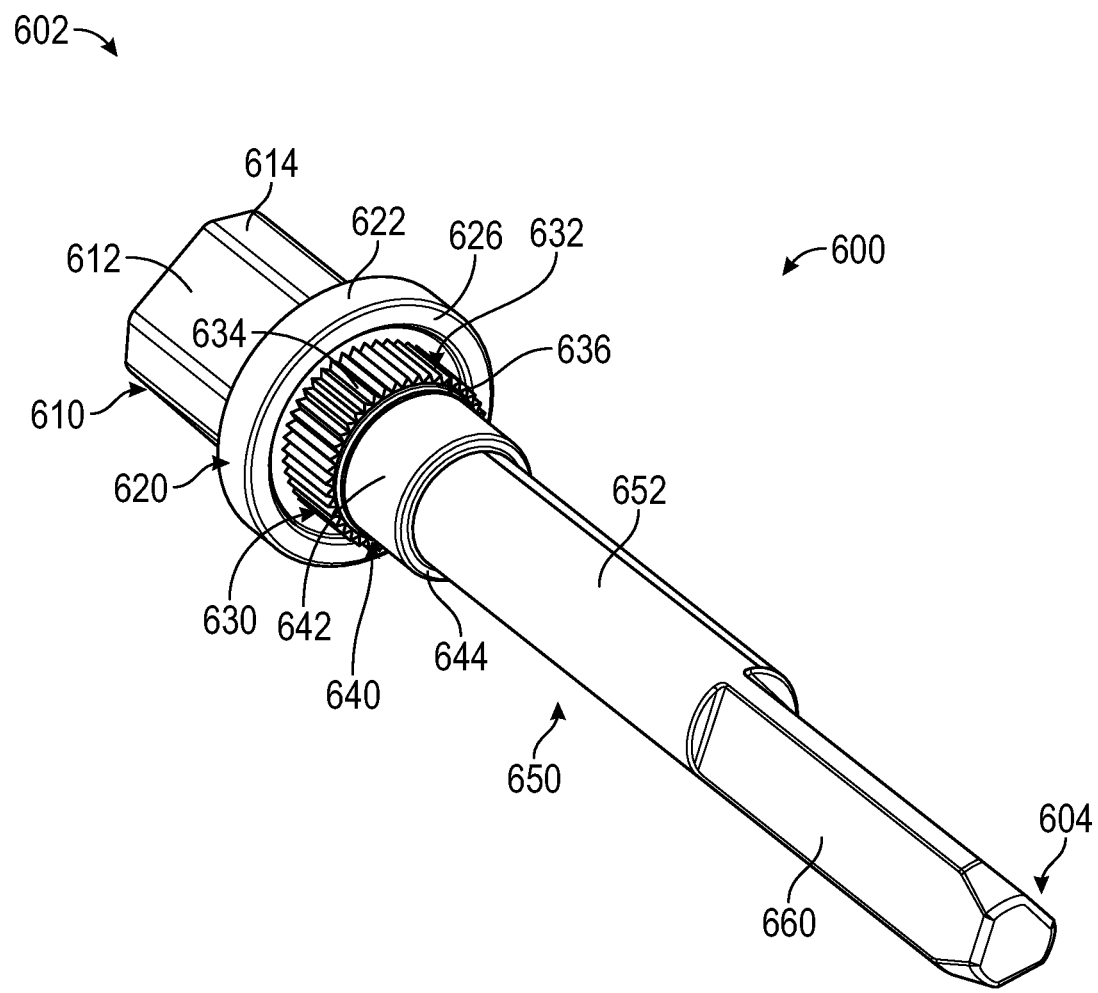
FIG. 18 is a perspective view of the shaft of FIGS. 8 and 9, according to another exemplary embodiment.
Figure 19:
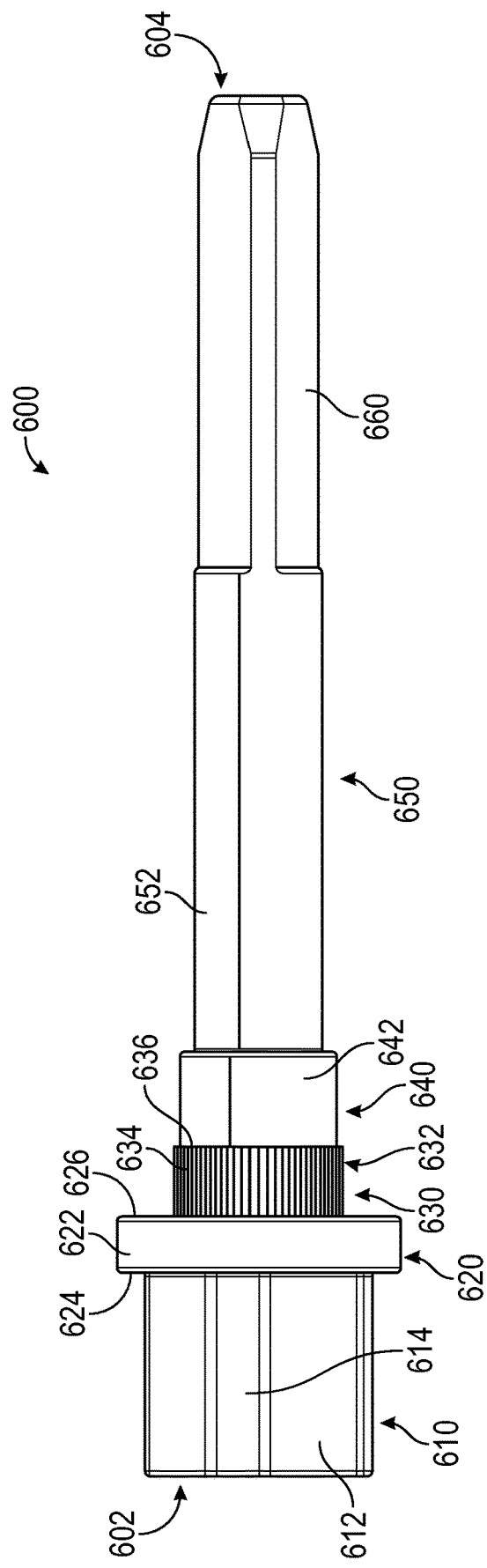
FIG. 19 is a side view of the shaft of FIG. 18, according to an exemplary embodiment.

As shown in FIGS. 16 and 17, before the shaft 600 engages with the cam 800, the outer face 632 of the cam interface 630 includes a smooth surface. As shown in FIGS. 18 and 19, after the shaft 600 engages with the cam 800 via a press-fit connection, the outer face 632 of the cam interface 630 defines a plurality of teeth, shown as cam teeth 634, that are formed through engagement of the outer face 632 of the cam interface 630 with inner teeth 834 of the cam 800 (e.g., plastically, permanently, etc. deforming the outer face 632 of the cam interface 630 of the shaft 600). In other embodiments, the shaft 600 is manufactured such that the shaft 600 includes the cam teeth 634 on the outer face 632 of the cam interface 630 before engaging with the cam 800.

As shown in FIG. 9, the shaft 600 engages with the guide plate 300, the tooth plate 400, the shaft bushing 700, and the cam 800 of the locking mechanism 220. More specifically, the shaft 600 (i) extends through the shaft aperture 380 of the guide plate 300 with the outer peripheral wall 622 of the shaft ring 620 in engagement with the inner face 382 of the shaft aperture 380 of the guide plate 300 and the end knob 610 extending outward from the housing 230, (ii) the interior face 626 of the shaft ring 620 engages and abuts against a surface of the cam 800, (iii) the cam interface 630 of the shaft 600 extends through an aperture of the cam 800 and the outer face 632 of the cam interface 630 engages with inner face 832 of the cam 800 and the inner teeth 834 thereof (e.g., which forms the cam teeth 634 along the outer face 632), (iv) the end face 636 of the cam interface 630 engages and abuts against the outer face 710 of the shaft bushing 700 received within the shaft bushing aperture 430 of the tooth plate 400, (v) the bushing interface 640 of the shaft 600 extends through the shaft aperture 720 of the shaft bushing 700 and the outer face 642 of the bushing interface 640 engages the inner face 730 of the shaft bushing 700, and (vi) the shaft end portion 650 extends through the shaft bushing aperture 430 of the tooth plate 400 and outward from the housing 230. According to an exemplary embodiment, the shaft 600 and the guide plate 300 are free to rotate relative to each other.

As shown in FIGS. 3 and 5, the connecting shaft 210 includes a first end, shown as end 212, and an opposing second end, shown as end 214. As shown in FIG. 5, a first one of the locking mechanisms 220 includes a compact shaft, shown as hub 601, instead of the shaft 600. According to an exemplary embodiment, the hub 601 is similar to the shaft 600 except the hub 601 does not include the shaft end portion 650 and the triangular key 660. Rather, the end 212 of the connecting shaft 210 is configured to be received by an aperture of the hub 601 of the first one of the locking mechanisms 220 and the end 214 of the connecting shaft 210 is configured to receive the triangular key 660 of the shaft end portion 650 of the shaft 600 of a second one of the locking mechanisms 220. The connecting shaft 210 facilitates the rotation between the locking mechanisms 220 such that the degree of rotation on one locking mechanism 220 is the same or about the same degree of rotation on the other locking mechanism 220, as well as both locking mechanisms 220 can be simultaneously activated. In other embodiments, both locking mechanisms 220 include the shaft 600 such that the end 212 is configured to receive the triangular key 660 of the shaft end portion 650 of the shaft 600 of the first one of the locking mechanisms 220 and the end 214 is configured to receive the triangular key 660 of the shaft end portion 650 of the shaft 600 of the second one of the locking mechanisms 220.

Cam

Figure 21:
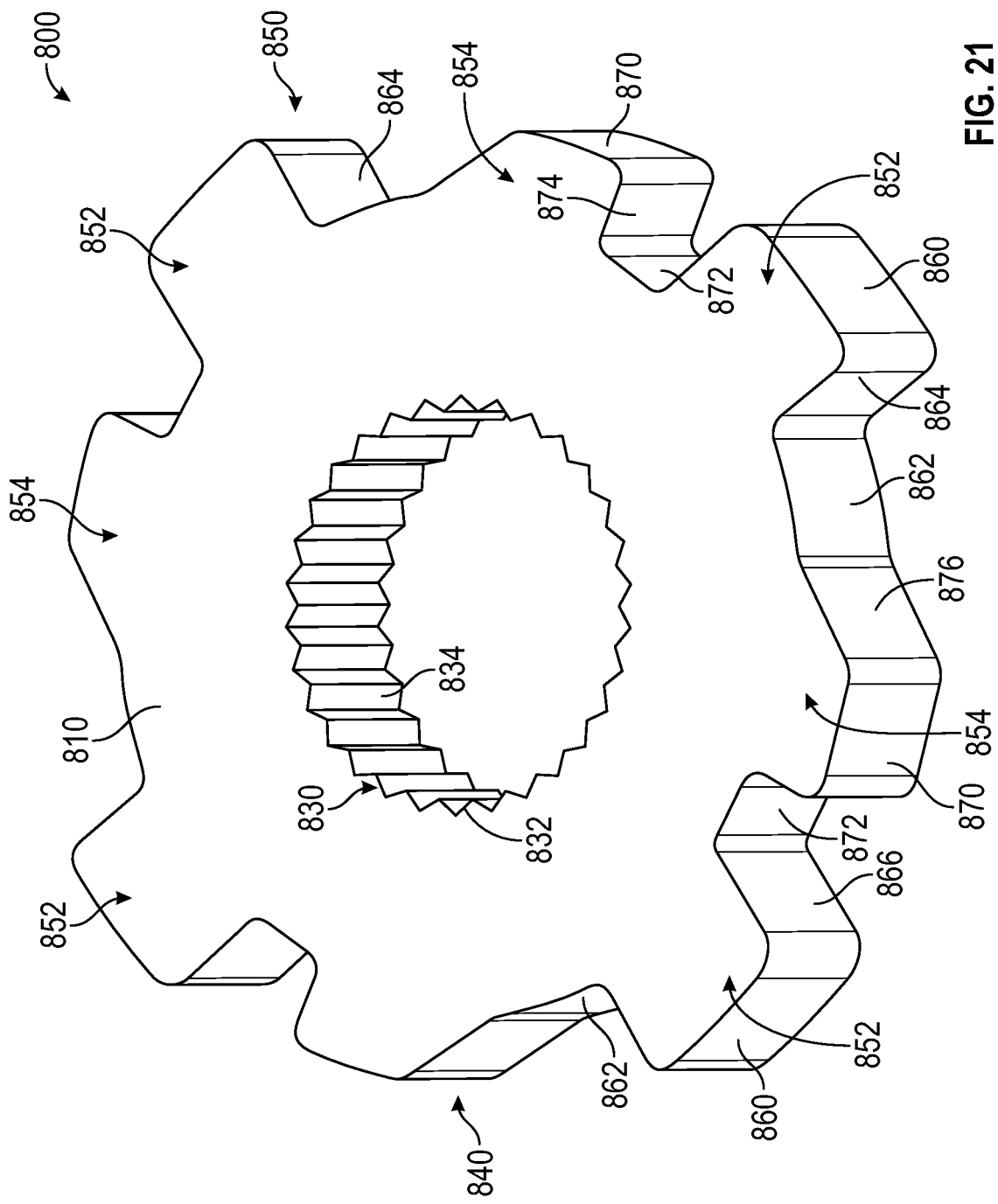
FIG. 21 is a perspective view of the cam of FIGS. 8 and 9, according to an exemplary embodiment.
Figure 22:
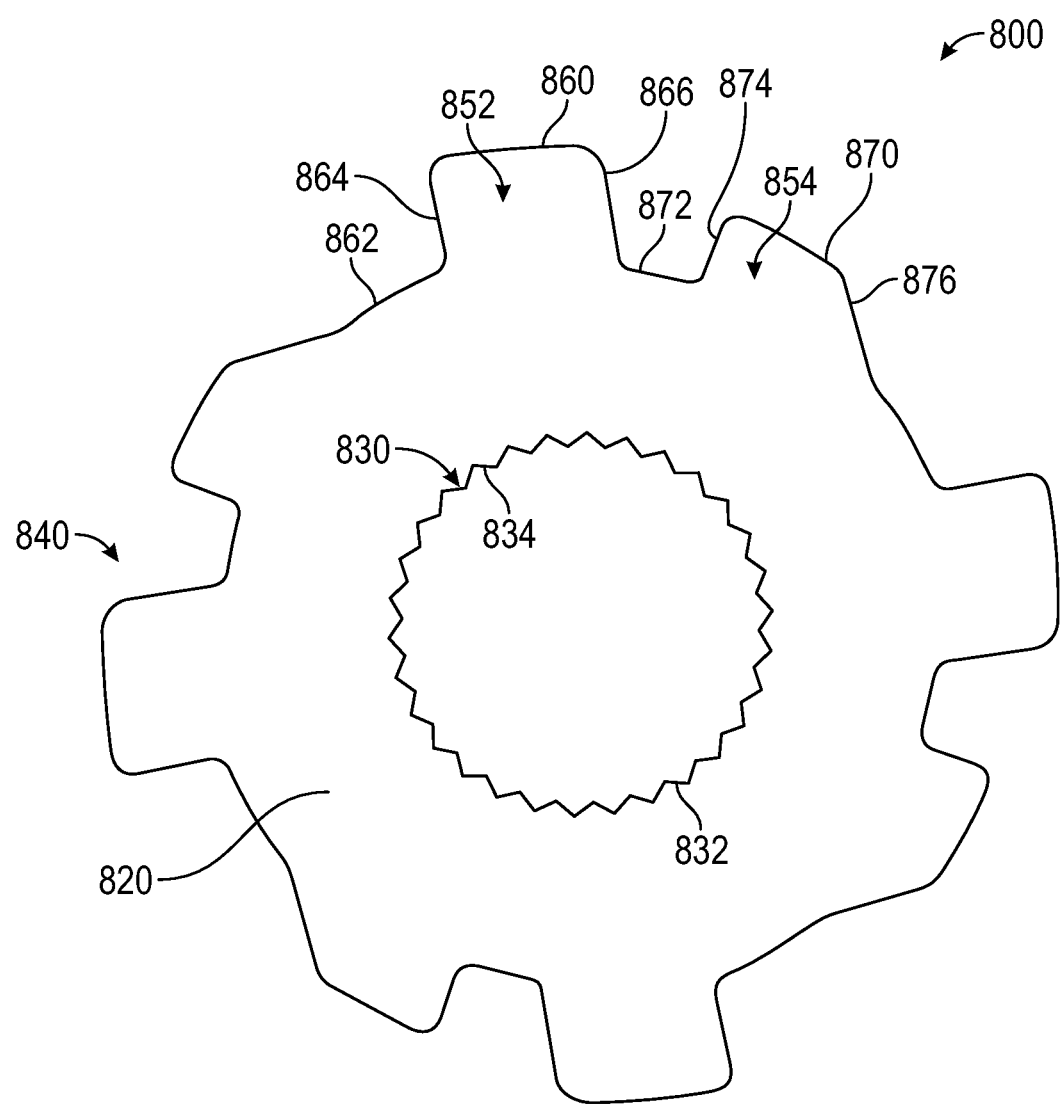
FIG. 22 is a side view of the cam of FIG. 21, according to an exemplary embodiment.

As shown in FIGS. 9, 21 and 22, the cam 800 has (i) a first side surface, shown as first side face 810, (ii) a second side surface, shown as second side face 820, (iii) an aperture, shown as shaft aperture 830, including an inner surface, shown as inner face 832, that defines a plurality of teeth, shown as inner teeth 834, and (iv) an outer peripheral surface, shown as outer profile 840, that includes a plurality of teeth, shown as cam lobes 850. According to an exemplary embodiment, the inner teeth 834 of the cam 800 have a diametral pitch and a pressure angle that is equal or approximately equal to a diametral pitch and pressure angle of the cam teeth 634 of the cam interface 630 of the shaft 600. As shown in FIG. 9, the cam 800 is coupled to the shaft 600 such that (i) shaft aperture 830 of the cam 800 receives the cam interface 630 of the shaft 600, (ii) the inner teeth 834 of the cam 800 engage with the outer face 632 of the cam interface 630 to define cam teeth 634 of the cam interface 630 of the shaft 600 (e.g., when press fit together) such that the cam 800 is rotationally fixed relative to the shaft 600, and (iii) the first side face 810 of the cam 800 engages with and contacts the interior face 626 of the shaft ring 620.

As shown in FIGS. 21 and 22, the cam lobes 850 of the cam 800 include varied sized lobes including a first plurality of lobes, shown as large lobes 852, and a second plurality of lobes, shown as small lobes 854, such that the outer profile 840 varies along the periphery thereof. The large lobes 852 include upper surfaces, shown as top lands 860, lower surfaces, shown as bottom lands 862, first side surfaces, shown as first side faces 864, and second side surface, shown as second side faces 866. The small lobes 854 include upper surfaces, shown as top lands 870, lower surfaces, shown as bottom lands 872, first side surfaces, shown as first side faces 874, and second side surfaces, shown as second side faces 876.

Release Plate

Figure 26:
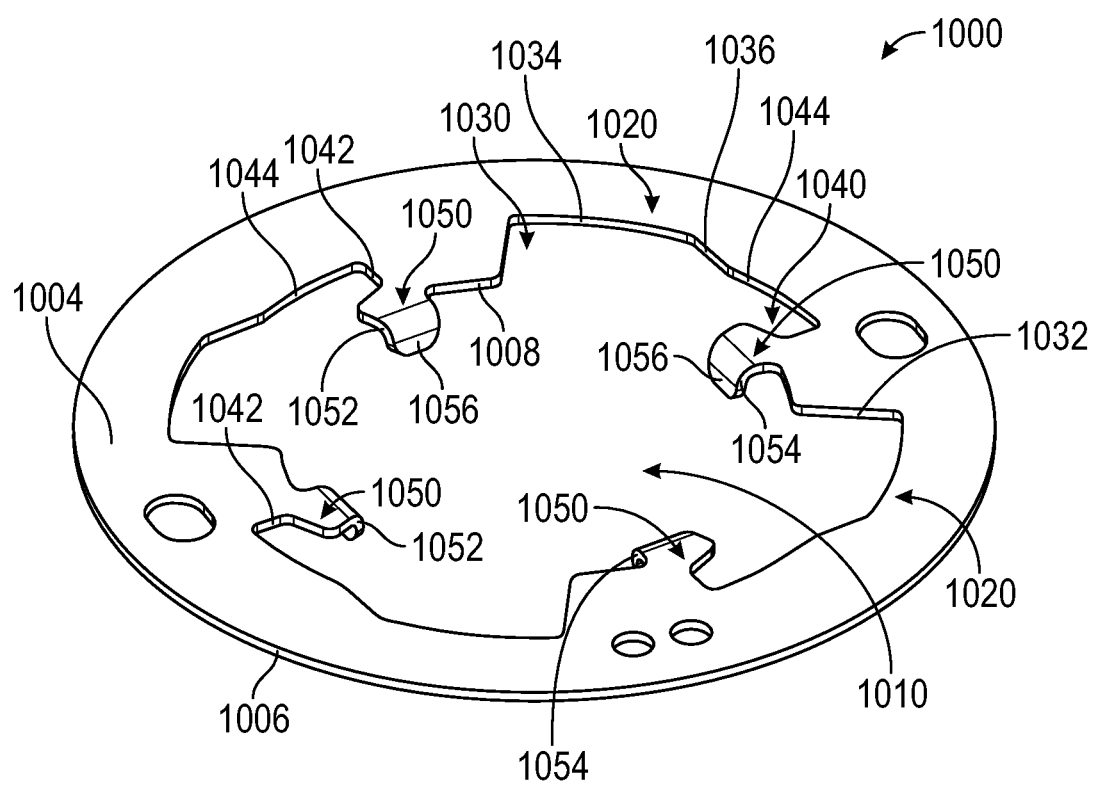
FIG. 26 is a perspective view of the release plate of FIGS. 8 and 9, according to an exemplary embodiment.

As shown in FIGS. 8 and 26, the release plate 1000 has a first surface, shown as first face 1002, an opposing second surface, shown as second face 1004, an outer surface, shown as outer periphery 1006, and (iv) an inner surface, shown as inner rim 1008. The inner rim 1008 of the release plate 1000 defines a main aperture, shown as main pocket 1010, and a plurality of notches or channels (e.g., four notches or channels), shown as sub-pockets 1020, that are evenly distributed about the outside of the main pocket 1010. Each of the sub-pockets 1020 includes a first portion, shown as first sub-pocket portion 1030, and a second portion, show as second sub-pocket portion 1040. The first sub-pocket portion 1030 includes (i) a side surface, shown as end face 1032, (ii) a first inner surface, shown as first inner face 1034, oriented substantially perpendicular to the end face 1032, and (iii) a second inner surface, shown as second inner face 1036, oriented at a slight angle relative to the first inner face 1034. The second sub-pocket portion 1040 includes (i) a side surface, shown as end face 1042, and (ii) an inner surface, shown as inner face 1044, (a) oriented substantially perpendicular to the end face 1042, (b) oriented at an angle relative to the second inner face 1036, and (c) extending between the end face 1042 and the second inner face 1036. According to an exemplary embodiment, the end face 1032 of the first sub-pocket portion 1030 is longer or taller than the end face 1042 of the second sub-pocket portion 1040. In other embodiments, the end face 1042 of the second sub-pocket portion 1040 is longer or taller than the end face 1032 of the first sub-pocket portion 1030.

Figure 28:
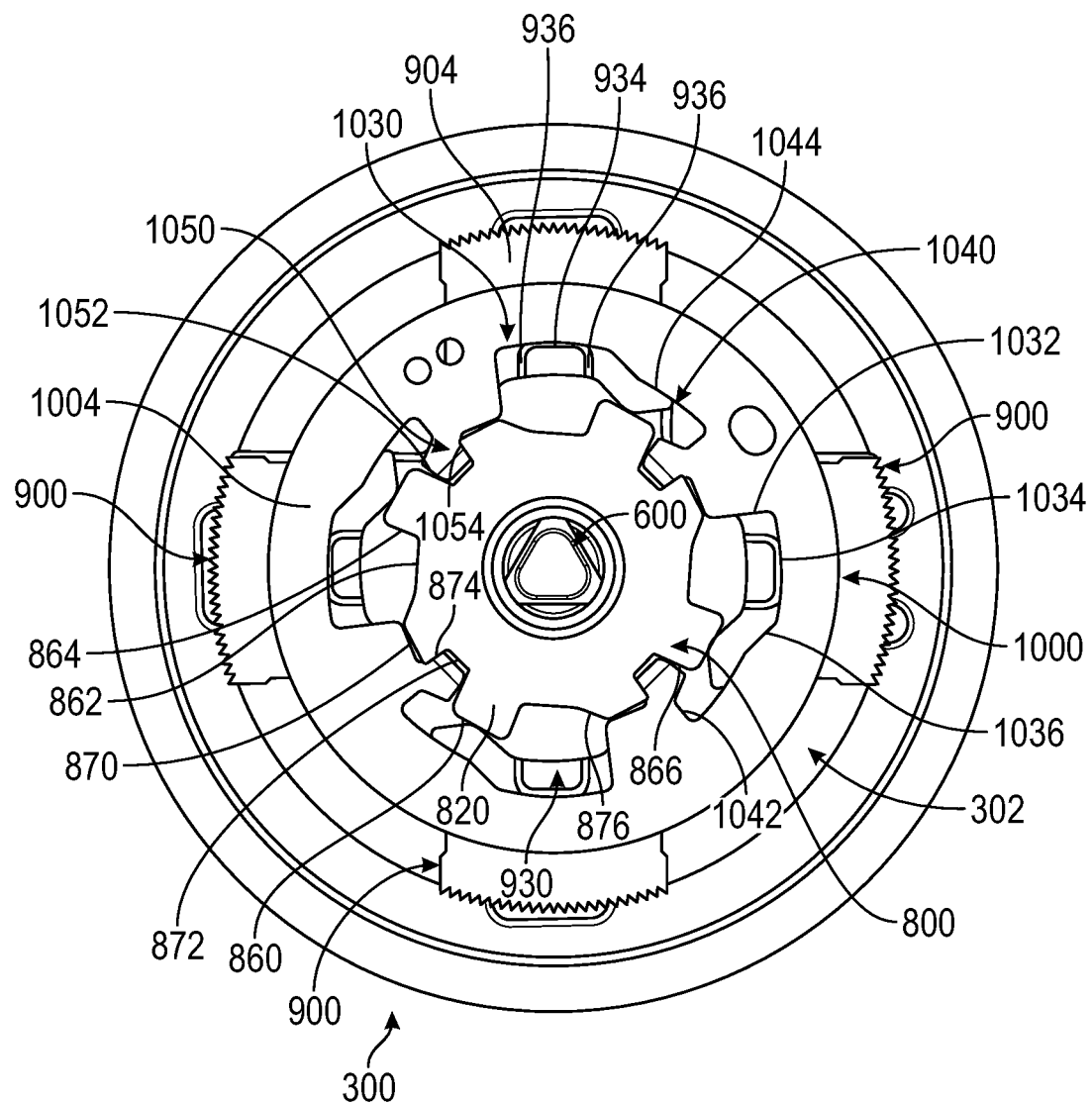
FIGS. 28-30 are cross-sectional views of the locking mechanism of FIGS. 6 and 7, according to an exemplary embodiment.

As shown in FIG. 26, the release plate 1000 includes a plurality of retainers, shown as flanges 1050, that (i) extend from the inner rim 1008 between the sub-pockets 1020 into the main pocket 1010 and (ii) curve away from the second face 1004 and extend past the first face 1002. Each of the flanges 1050 includes a first side surface, shown as first side face 1052, a second side surface, shown as second side face 1054, and an outer surface, shown as outer lip 1056. As shown in FIG. 28, the release plate 1000 is coupled to the cam 800 with each of the flanges 1050 extending between an adjacent set of one of the large lobes 852 and one of the small lobes 854 of the cam 800 such that (i) the first side faces 1052 of the flanges 1050 of the release plate 1000 engage and contact the second side faces 866 of the large lobes 852 of the cam 800, (ii) the second side faces 1054 of the flanges 1050 of the release plate 1000 engage and contact the first side faces 874 of the small lobes 854 of the cam 800, and (iii) the outer lip 1056 of the flanges 1050 of the release plate 1000 extend along and proximate the bottom lands 872 of the small lobes 854 of the cam 800 and between the adjacent set of the one of the large lobes 852 and the one of the small lobes 854. Such engagement between the cam 800 and the release plate 1000 may, therefore, rotationally fix the cam 800 and the release plate 1000 together such that they rotate with one another.

Spring

Figure 27:
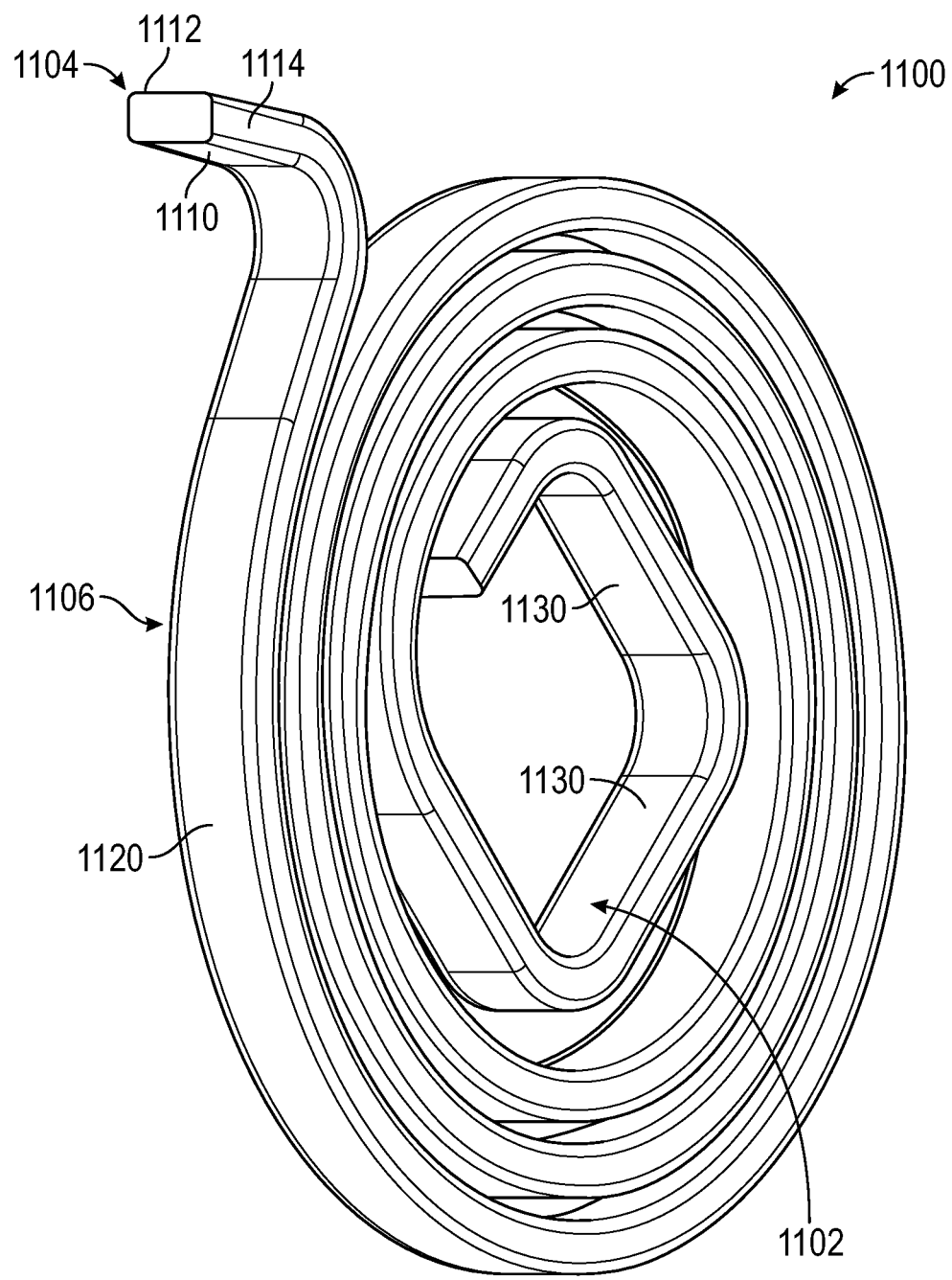
FIG. 27 is a perspective view of the spring of FIGS. 8 and 9, according to an exemplary embodiment.

As shown in FIG. 27, the spring 1100 includes (i) a first or inner retainer, shown as inner grip 1102, (ii) a second or outer retainer, shown as outer tab 1104, and (iii) a coil body, shown as body 1106, that extends from the inner grip 1102 in a coil form and terminates at the outer tab 1104. The outer tab 1104 has an inner surface, shown as inner face 1110, an outer surface, shown as outer face 1112, and two side surfaces, shown as side faces 1114. The body 1106 includes an outer surface, shown as outer face 1120. As shown in FIG. 6, the spring 1100 is coupled to the guide plate 300 such that (i) the inner face 1110 of the outer tab 1104 of the spring 1100 engages and is in contact with the cylindrical face 344 of the circular tab 340 of the guide plate 300, (ii) the outer face 1112 of the outer tab 1104 of the spring 1100 engages and is in contact with the flat face 356 at least one of the semi-circular tabs 350 of the guide plate 300, (iii) one of the side faces 1114 of the outer tab 1104 of the spring 1100 engages and is in contact with the first portion 330 of the outer face 304 of the guide plate 300, and (iv) the outer face 1120 of the body 1106 of the spring 1100 is positioned between the inner faces 366 of the securing tabs 360 of the guide plate 300. The outer tab 1104 of the spring 1100 may, therefore, be fixed relative to the guide plate 300. As shown in FIG. 27, the inner grip 1102 includes inner surfaces, shown as inner faces 1130. As shown in FIG. 6, the spring 1100 is coupled to the shaft 600 such that the inner faces 1130 of the inner grip 1102 of the spring 1100 engage with and are in contact with the knob profile 612 of the end knob 610 of the shaft 600. The inner grip 1102 of the spring 1100 may, therefore, be fixed relative to the shaft 600. Accordingly, as the shaft 600 is engaged, the tension in the spring 1100 can be increased and decreased depending on the direction of rotation of the shaft 600.

Pawls

Figure 23:
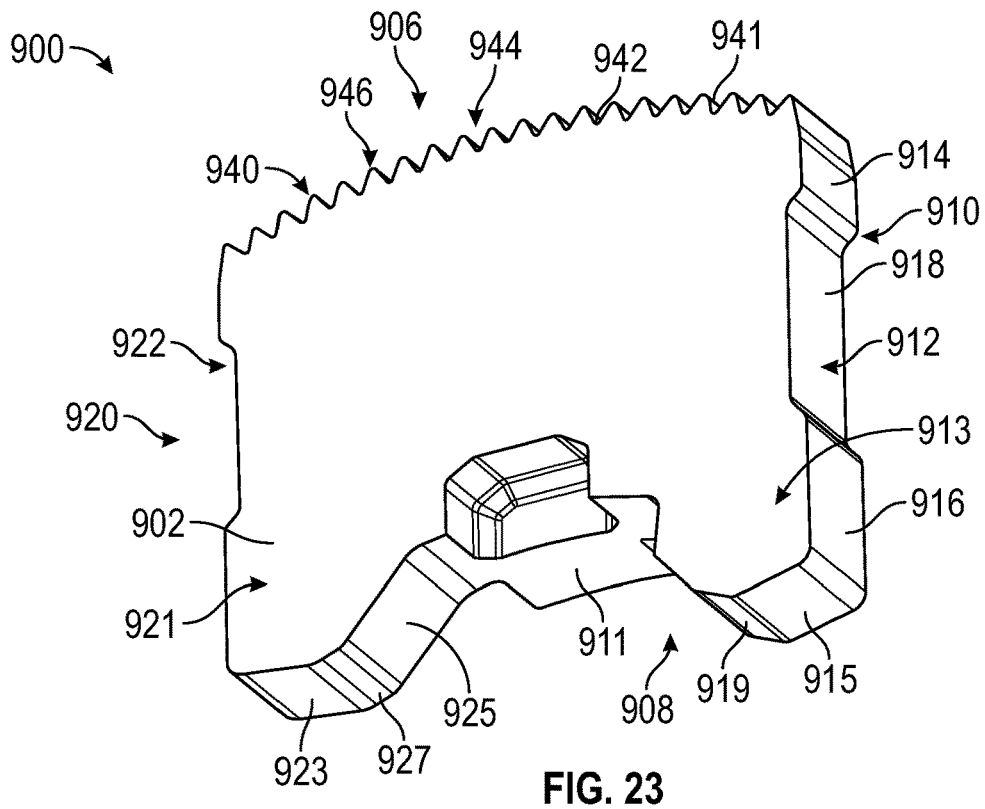
FIGS. 23 and 24 are various perspective views of the pawl of FIGS. 8 and 9, according to an exemplary embodiment.
Figure 24:
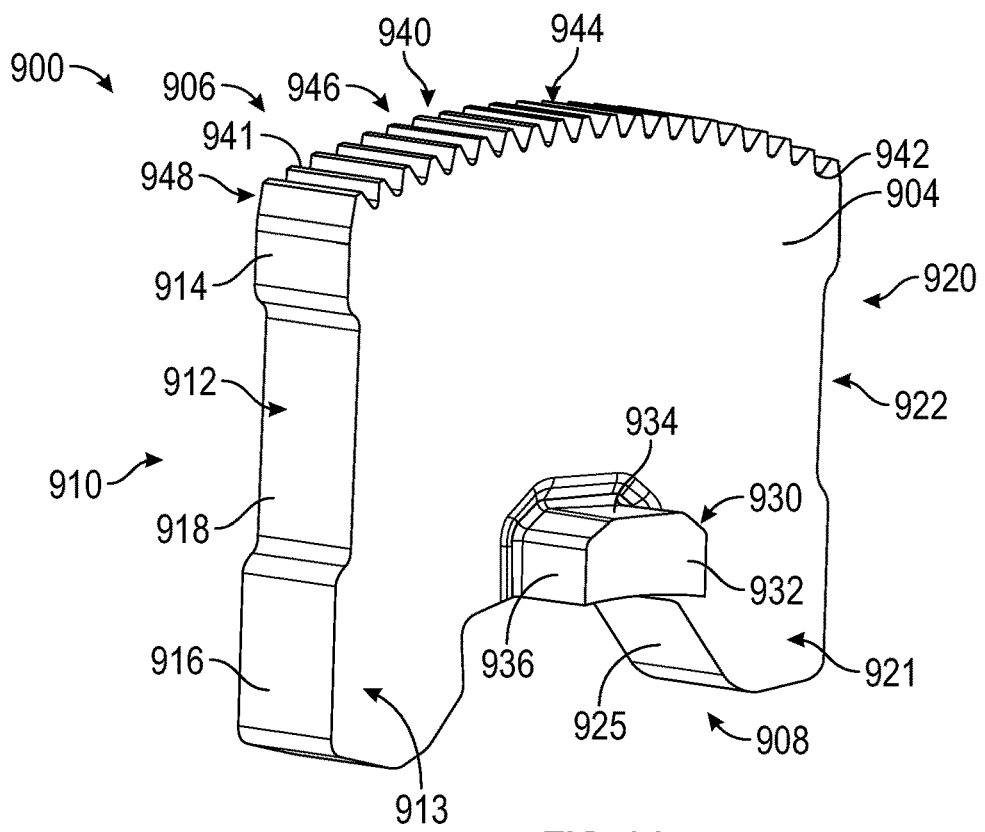
Figure 25:
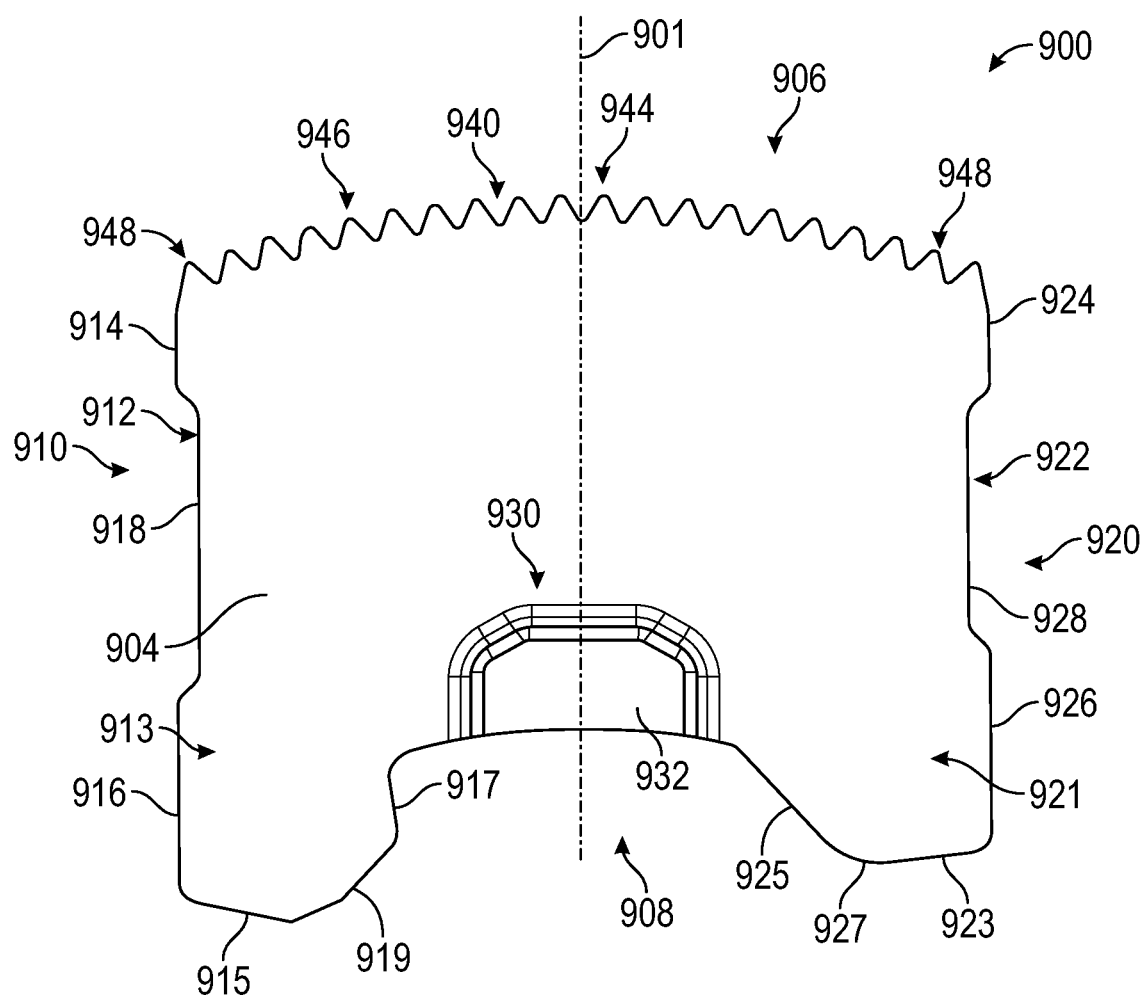
FIG. 25 is a side view of the pawl of FIGS. 23 and 24, according to an exemplary embodiment.

As shown in FIGS. 23-25, the pawl 900 has a first surface, shown as front face 902, an opposing second surface, shown as rear face 904, an upper surface or profile, shown as upper profile 906, a lower surface or profile, shown as lower profile 908, a first side surface, shown as first side profile 910, and an opposing second side surface, shown as second side profile 920. The pawl 900 defines a center line, shown as center line 901, that is equally spaced between (a) the front face 902 and the rear face 904 and (b) the first side profile 910 and the second side profile 920. The pawl 900 includes a protrusion or retainer, shown as pawl tab 930, that extends outward from the rear face 904 and terminates with a flat surface, shown as outer face 932. The pawl tab 930 includes an upper surface, shown as upper face 934, and two side surfaces, shown as side faces 936.

As shown in FIGS. 23-25 and 33-36, the upper profile 906 of the pawl 900 defines a plurality of teeth, shown as teeth 940. The teeth 940 have a top surface, shown as top land 941, and a bottom surface, shown as bottom land 942. The teeth 940 include (i) a pair of middle teeth, shown as middle teeth 944, positioned at the middle of the upper profile 906, (ii) a plurality of end teeth, shown as end teeth 948, positioned at both ends of the upper profile 906, and (iii) a plurality of intermediate teeth, shown as intermediate teeth 946, positioned along the upper profile 906 and between the middle teeth 944 and the end teeth 948.

As shown in FIGS. 23-25 and 29-36, the lower profile 908 of the pawl 900 includes (i) a bottom surface, shown as bottom land 911, (ii) a first protrusion, shown as large pawl protrusion 913, positioned at and extending from a first end of the bottom land 911 and that includes (a) a bottommost surface, shown as top land 915, (b) a side surface, shown as side face 917, and (c) an edge surface, shown as edge face 919, that is positioned between the top land 915 and the side face 917, and (iii) a second protrusion, shown as small pawl protrusion 921, positioned at and extending from an opposing second side of the bottom land 911 and that includes (a) a bottommost surface, shown as top land 923, (b) a side surface, shown as side face 925, and (c) an edge surface, shown as edge face 927, that is positioned between the top land 923 and the side face 925.

As shown in FIGS. 23-25 and 33-36, the first side profile 910 of the pawl 900 defines a first indentation or notch, shown as first indent 912, such that the first side profile 910 has a first outer surface, shown as first outer face 914, a second outer surface, shown as second outer face 916, and an inner surface, shown as inner face 918, positioned between the first outer face 914 and the second outer face 916. The second side profile 920 of the pawl 900 defines a second indentation or notch, shown as second indent 922, such that the second side profile 920 has a first outer surface, shown as first outer face 924, a second outer surface, shown as second outer face 926, and an inner surface, shown as inner face 928, positioned between the first outer face 924 and the second outer face 926. According to an exemplary embodiment, the first side profile 910 defines only one first indent 912 and the second side profile 920 defines only one second indent 922. In other embodiments, the first side profile 910 defines multiple first indents 912 and/or the second side profile 920 defines multiple second indents 922.

Figure 30:
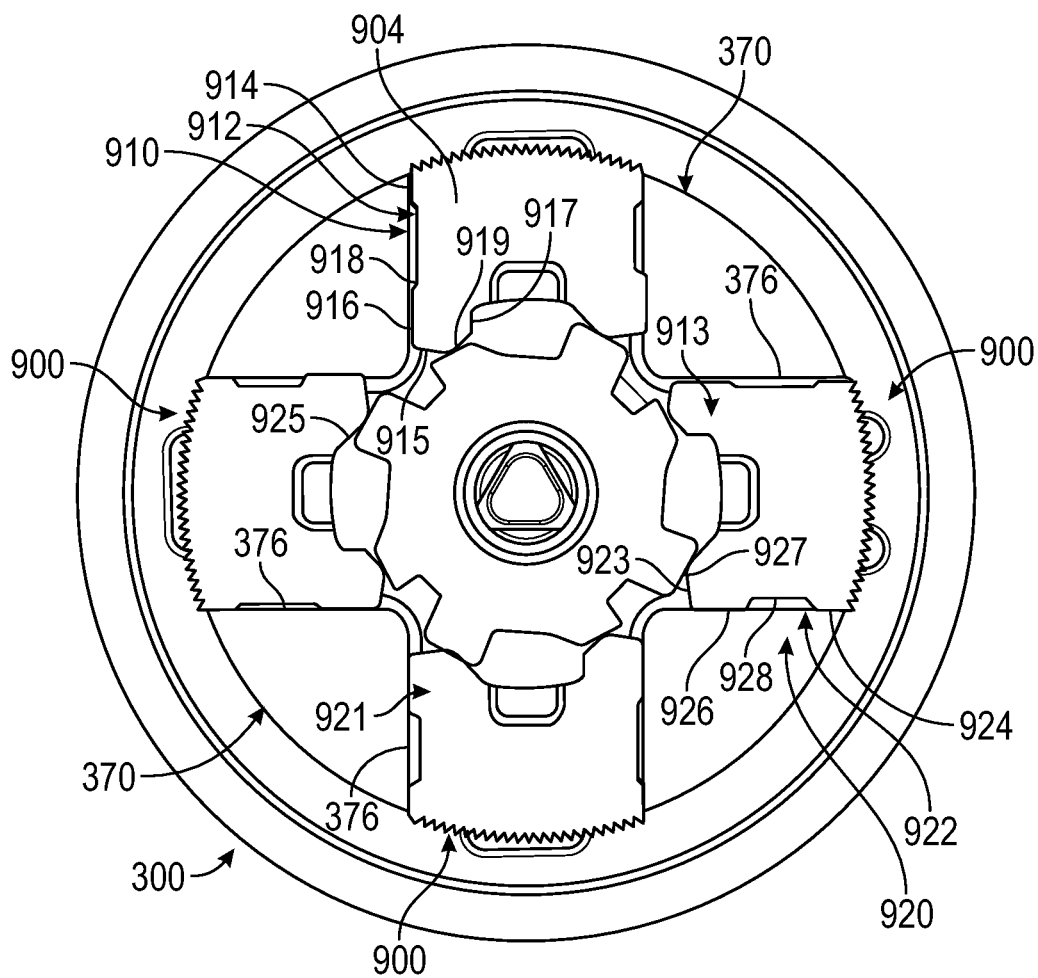

As shown in FIGS. 30, the pawls 900 are inserted into or disposed in the guide plate 300 such that, for each pawl 900, (i) the front face 902 of the pawl 900 engages with the inner face 302 of the guide plate 300, (ii) the first outer face 914 of the first side profile 910 of the pawl 900 and the second outer face 916 of the first side profile 910 of the pawl engage with and contact one of the guide faces 376 of a first one of the guide tabs 370 of the guide plate 300 with the inner face 918 spaced therefrom, and (iii) the first outer face 924 of the second side profile 920 of the pawl 900 and the second outer face 926 of the second side profile 920 of the pawl 900 engages with and contacts one of the guide faces 376 of a second one of the guide tabs 370 of the guide plate 300 with the inner face 928 spaced therefrom. According to an exemplary embodiment, the pawls 900 translate radially outward from the center of the guide plate 300 within one of the guide portions (e.g., the first guide portion 320, the second guide portion 322, the third guide portion 324, the fourth guide portion 326, etc.), along the guide faces 376 of the guide tabs 370, and into and out of engagement with the tooth plate 400, as described in more detail herein.

Pawl, Cam, Release Plate, and Tooth Plate Engagement

As shown in FIGS. 28-32, the pawls 900 are repositionable between (i) a first position or retracted position where the teeth 940 of the pawls 900 are disengaged from the teeth 420 of the tooth plate 400 such that the locking mechanism 220 is in an unlocked orientation and (ii) a second or expanded position where the teeth 940 of the pawls 900 engage with the teeth 420 of the tooth plate 400 such that the locking mechanism 220 is in a locked orientation. As described in more detail herein, the cam 800 and the release plate 1000 facilitate translating the pawls 900 between the retracted position and the expanded position as the shaft 600 is rotated.

Figure 29:
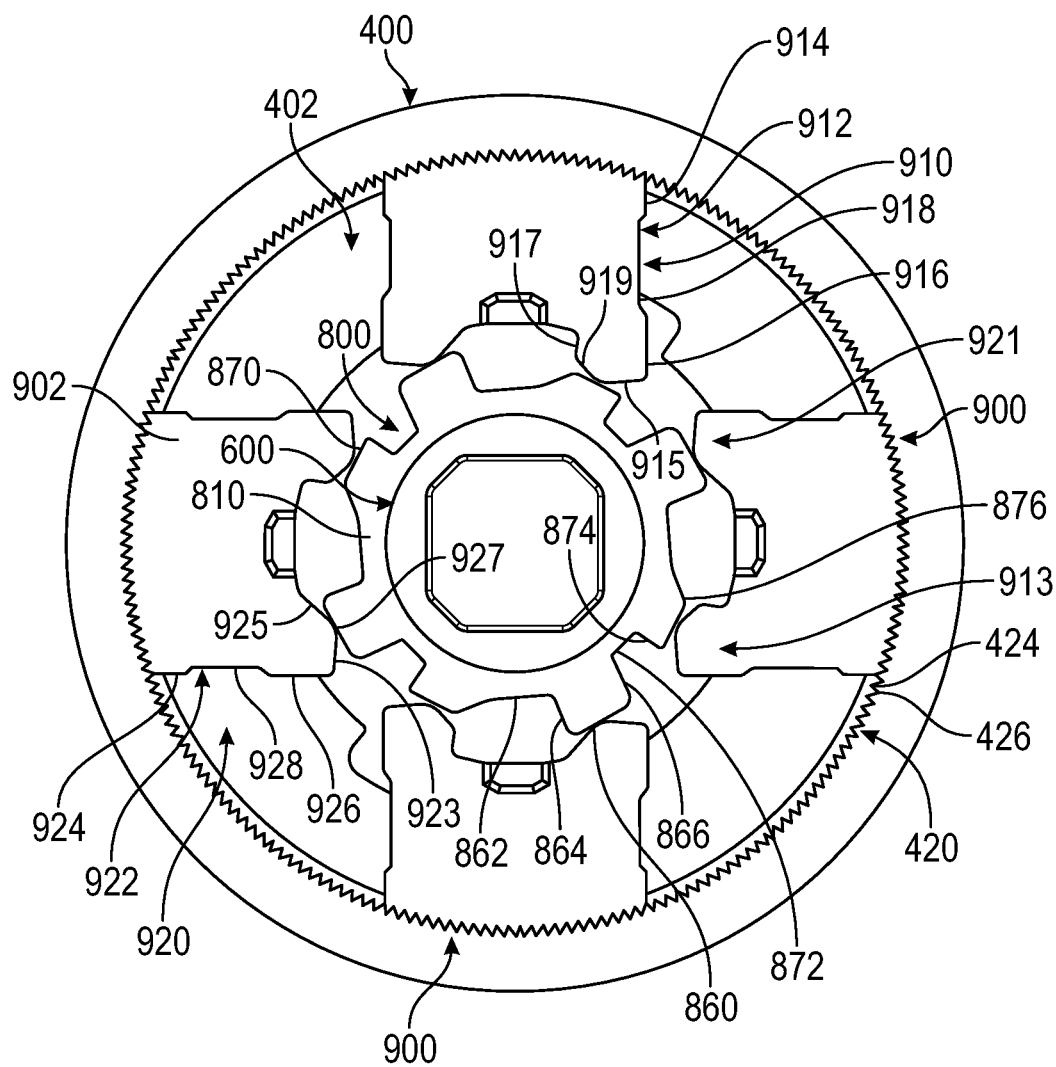
Figure 31:
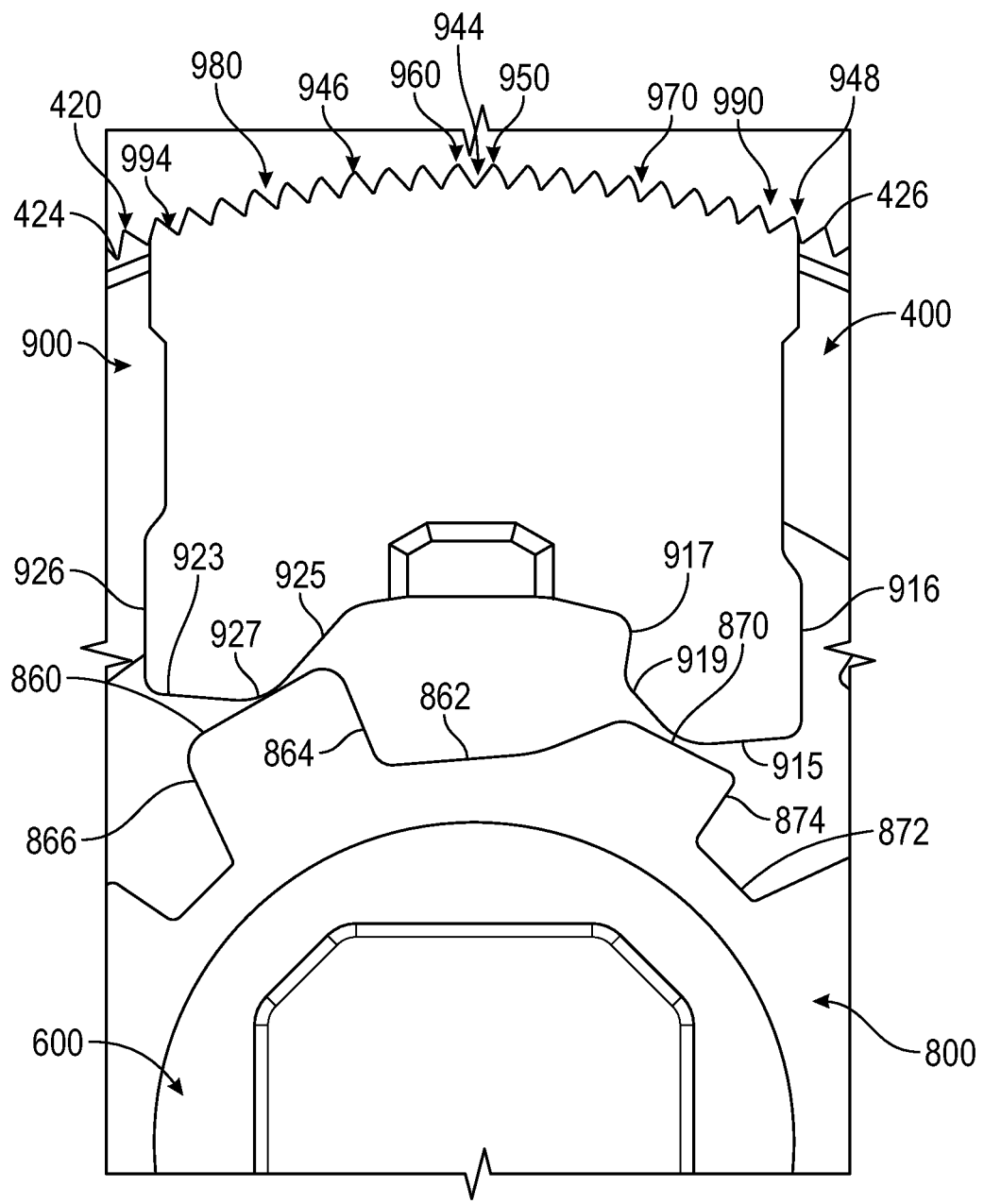
FIG. 31 is a detailed cross-sectional view of the locking mechanism of FIGS. 6 and 7 in a locked orientation, according to an exemplary embodiment.

As shown in FIGS. 28-31, in the locked orientation, the cam 800 engages with the pawls 900 where the edge faces 927 of the small pawl protrusions 921 of the pawls 900 engage with and contact the top lands 860 of the large lobes 852 of the cam 800. As shown in FIGS. 29 and 31, such engagement between the small pawl protrusions 921 and the large lobes 852 push the pawls 900 into the expanded position such that the teeth 940 thereof engage with the teeth 420 of the tooth plate 400.

Figure 32:
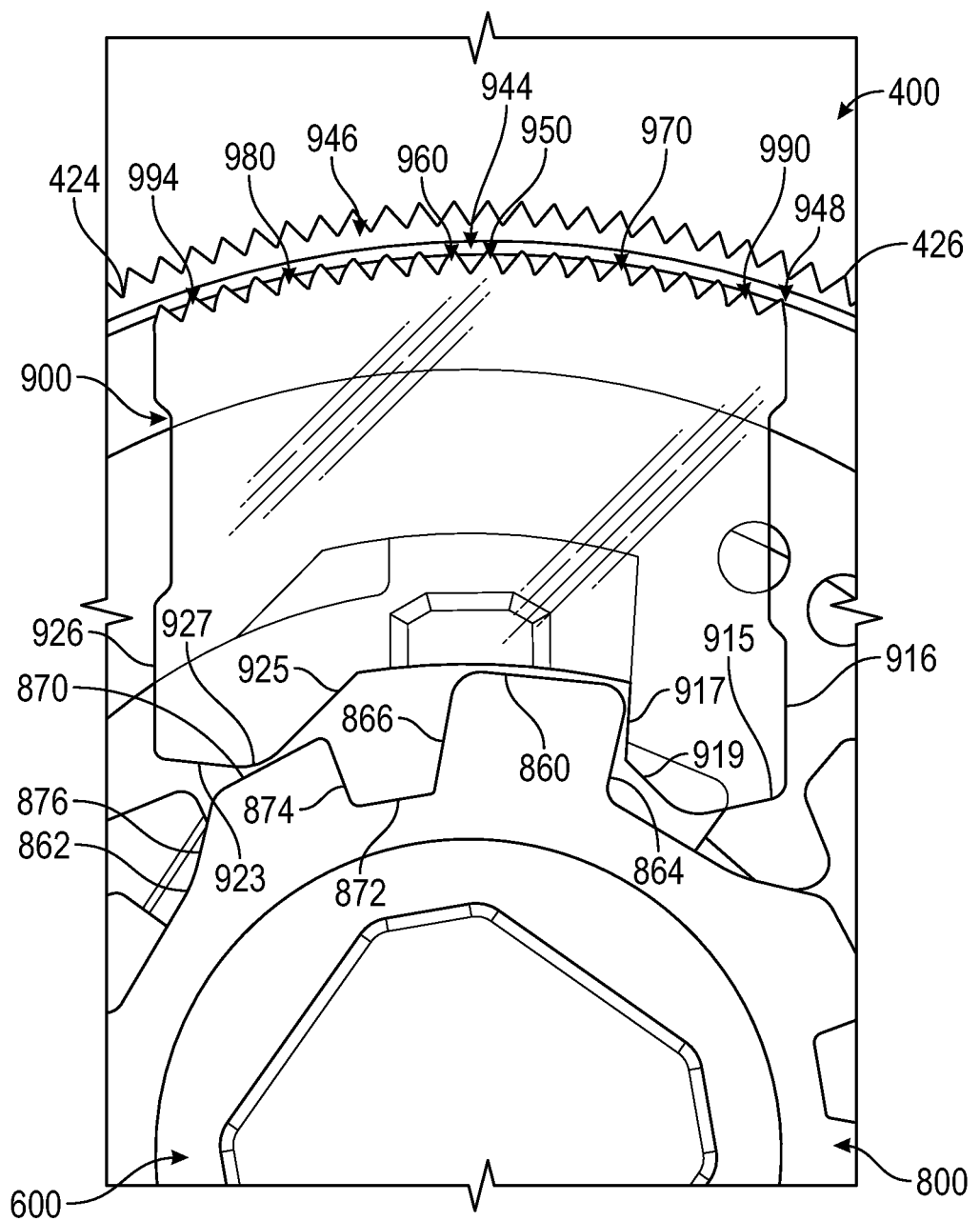
FIG. 32 is a detailed cross-sectional view of the locking mechanism of FIGS. 6 and 7 in an unlocked orientation, according to an exemplary embodiment.

As shown in FIG. 32, in the unlocked orientation, the cam 800 engages with the pawls 900 where the large lobes 852 are positioned between the small pawl protrusions 921 and the large pawl protrusions 913 with (i) the top lands 860 of the large lobes 852 of the cam 800 positioned proximate the bottom lands 911 of the lower profiles 908 of the pawls 900 and (ii) the first side faces 864 of the large lobes 852 of the cam 800 engaging with and contacting the side faces 917 of the large pawl protrusion 913 of the pawls 900. Such engagement between the large pawl protrusions 913 and the large lobes 852 retracts the pawls 900 into the retracted position such that the teeth 940 thereof disengage from the teeth 420 of the tooth plate 400.

In prior recliner assembly designs, due to variations or imperfections that can occur in the manufacturing process, a release angle (e.g., an angle at which the teeth 940 of the upper profile 906 of the pawls 900 are uncoupled from the teeth 420 of the tooth plate 400) can be close to a full travel angle (e.g., an angle at which the cam 800 can travel (rotate) from beginning to end), causing difficulty in reclining a seat and switching between the locked and unlocked orientations. The large lobes 852 of the cam 800, the small lobes 854 of the cam 800, the large pawl protrusions 913 of the pawls 900, and the small pawl protrusions 921 of the pawls 900 provide (i) a mechanism to translate the pawls 900 radially relative to the center of the guide plate 300 and (ii) a large travel angle for the cam 800 to accommodate various release angles by preventing the small lobes 854 of the cam 800 from contacting the second outer faces 926 of the second side profile 920 of the pawls 900 and blocking the cam 800 from rotating further. In an exemplary embodiment, the release angle is between 10 to 15 degrees and the full travel angle is approximately 34 degrees.

As shown in FIG. 28, the release plate 1000 engages with the pawls 900 where (i) the rear faces 904 of the pawls 900 engage with or abut the first face 1002 of the release plate 1000 and (ii) the upper face 934 of the pawl tab 930 of each of the pawls 900 selectively engages with and/or selectively aligns with (a) the first inner face 1034 of the first sub-pocket portion 1030, (b) the second inner face 1036 of the first sub-pocket portion 1030, or (c) the inner face 1044 of the second sub-pocket portion 1040. According to an exemplary embodiment, the upper face 934 of the pawl tab 930 of the pawls 900 is positioned to translate (e.g., slide) along and relative to (i) the first inner face 1034 of the first sub-pocket portion 1030, (ii) the second inner face 1036 of the first sub-pocket portion 1030, and (iii) the inner face 1044 of the second sub-pocket portion 1040 (e.g., as the shaft 600, the cam 800, and the release plate 1000 rotate relative to the pawls 900, as the locking mechanism 220 is lock or unlocked, etc.). By way of example, if the upper face 934 of the pawl tab 930 of the pawls 900 is aligned and/or engaged with the first inner face 1034 of the first sub-pocket portion 1030, then the locking mechanism 220 is in the locked orientation. By way of another example, if the upper face 934 of the pawl tab 930 of the pawls 900 is aligned and/or engaged with the second inner face 1036 of the first sub-pocket portion 1030, then the locking mechanism 220 is transitioning (i) from the locked orientation to the unlocked orientation or (ii) from the unlocked orientation to the locked orientation. By way of still another example, if the upper face 934 of the pawl tab 930 of the pawls 900 is aligned and/or engaged with the inner face 1044 of the second sub-pocket portion 1040, then the locking mechanism 220 is in the unlocked orientation.

Pawl—Side Profile

According to an exemplary embodiment, the first indent 912 of the first side profile 910 and the second indent 922 of the second side profile 920 are configured to reduce friction between the pawls 900 and the guide plate 300 by reducing the amount of surface area of the first side profile 910 and the second side profile 920 that contacts with the guide faces 376 of the guide tabs 370 of the guide plate 300 as the pawls 900 translate between the retracted position and the expanded position (e.g., during normal loading conditions). Such reduction in friction facilitates easier engagement of the locked and unlocked orientations and, therefore, improved recliner functionality.

According to an exemplary embodiment, the first indent 912 of the first side profile 910 and the second indent 922 of the second side profile 920 are configured to facilitate providing a locking feature under a high or extreme load condition. By way of example, when the pawls 900 are being forced to rotate while engaged with the tooth plate 400 (e.g., by an occupant of the seat 40 pushing back or forward on the seat 40 without engaging the recliner assembly 200, during a high acceleration condition of the vehicle 10, etc.), the first indent 912 of the first side profile 910 and the second indent 922 of the second side profile 920 facilitate deformation of the pawl 900 such that (i) the first outer face 914 of the first side profile 910 and the second outer face 916 of the first side profile 910 deform and penetrate the guide face 376 of the guide tab 370 of the guide plate 300 with which they are in contact and/or (ii) the first outer face 924 of the second side profile 920 and the second outer face 926 of the second side profile 920 deform and penetrate the guide face 376 of the guide tab 370 of the guide plate 300 with which they are in contact. Such deformation and penetration keep the pawls 900, the guide plate 300, and the tooth plate 400 steady in the locked orientation and prevent disengagement of the teeth 940 of the pawls 900 from the teeth 420 of the tooth plate 400 and, thereby, prevent inadvertent rotation of the tooth plate 400 and the guide plate 300 relative to one another during a high loading condition (e.g., preventing inadvertent reclining of the seat 40 or inadvertent returning of the seat 40 to an upright position).

Pawl—Middle and Intermediate Teeth

Figure 33:
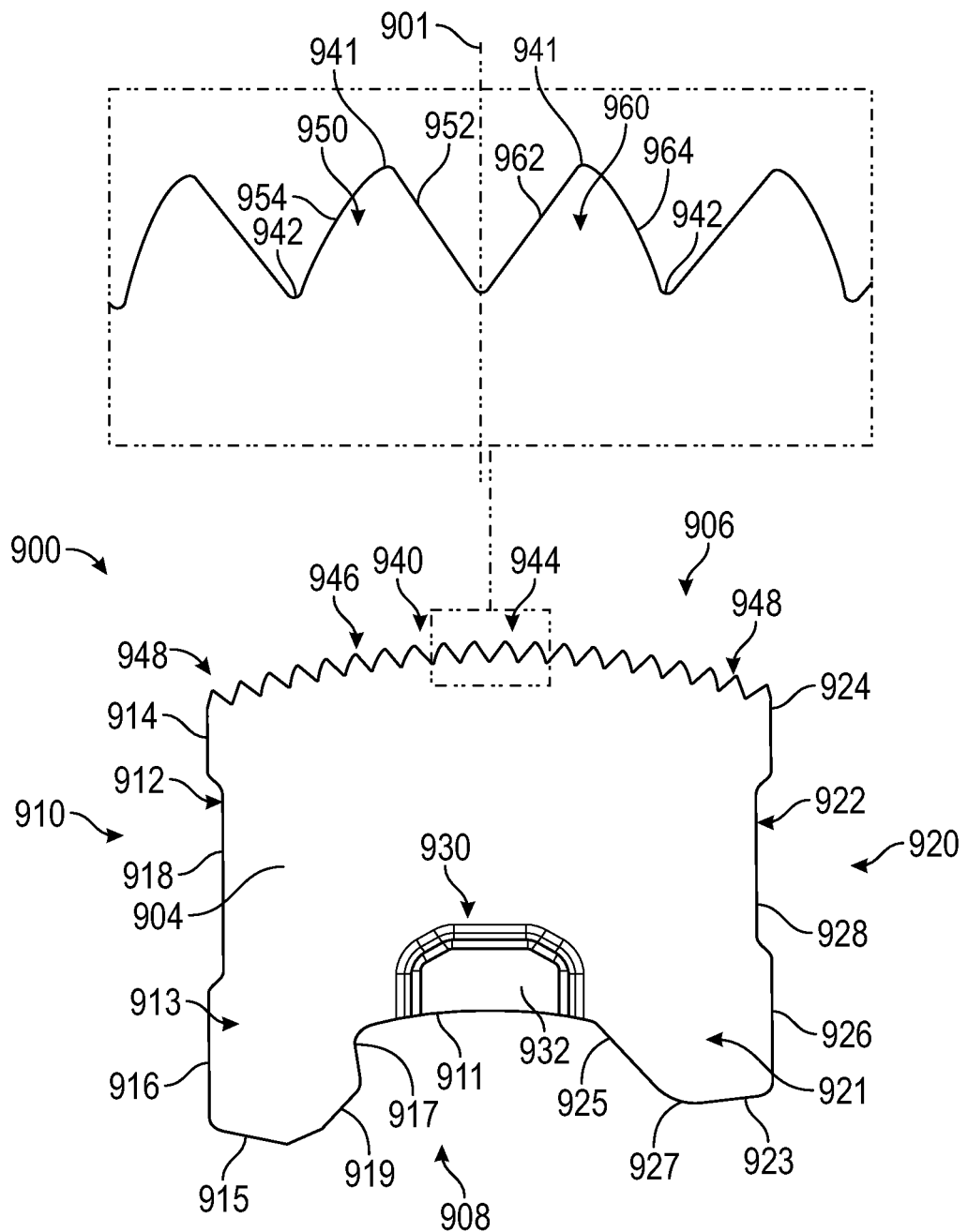
FIG. 33 is a detailed view of middle teeth of the pawl of FIG. 25, according to an exemplary embodiment.

As shown in FIG. 33, the middle teeth 944 of the pawl 900 include a first tooth, shown as first middle tooth 950, positioned on a first side of the center line 901 and a second tooth, shown as second middle tooth 960, positioned on an opposing second side of the center line 901. The first middle tooth 950 has a first surface, shown as flat face 952, and a second surface, shown as curved face 954. The second middle tooth 960 has a first surface, shown as flat face 962, and a second surface, shown as curved face 964. The first middle tooth 950 and the second middle tooth 960 are positioned such that (i) the flat face 952 of the first middle tooth 950 is positioned proximate and faces towards the center line 901, (ii) the flat face 962 of the second middle tooth 960 is positioned proximate and faces towards the center line 901, (iii) the flat face 952 of the first middle tooth 950 and the flat face 962 of the second middle tooth 960 face towards each other (e.g., in a "V" shape), and (iv) the curved face 954 of the first middle tooth 950 and the curved face 964 of the second middle tooth 960 face away from each other and the center line 901. According to an exemplary embodiment, the first middle tooth 950 and the second middle tooth 960 of the pawls 900 have equal or approximately equal pitch diameters but in different center coordinates.

As shown in FIG. 31, in the locked orientation, the middle teeth 944 of the pawls 900 engage with the teeth 420 of the tooth plate 400 such that the top land 941 of the middle teeth 944 of the pawl 900 interface with the bottom land 426 of the teeth 420 of the tooth plate 400 and the top land 424 of the teeth 420 of the tooth plate 400 interface with the bottom land 942 of the middle teeth 944. According to an exemplary embodiment, the flat face 952 of the first middle tooth 950 and the flat face 962 of the second middle tooth 960 of the pawls 900 do not engage with (under normal loading conditions) a corresponding side face 428 of the teeth 420 of the tooth plate 400 with which the first middle tooth 950 and the second middle tooth 960 interface, while the curved face 954 of the first middle tooth 950 and the curved face 964 of the second middle tooth 960 of the pawls 900 engage with and contact a corresponding side face 428 of the teeth 420 of the tooth plate 400 with which the first middle tooth 950 and the second middle tooth 960 interface.

Figure 34:
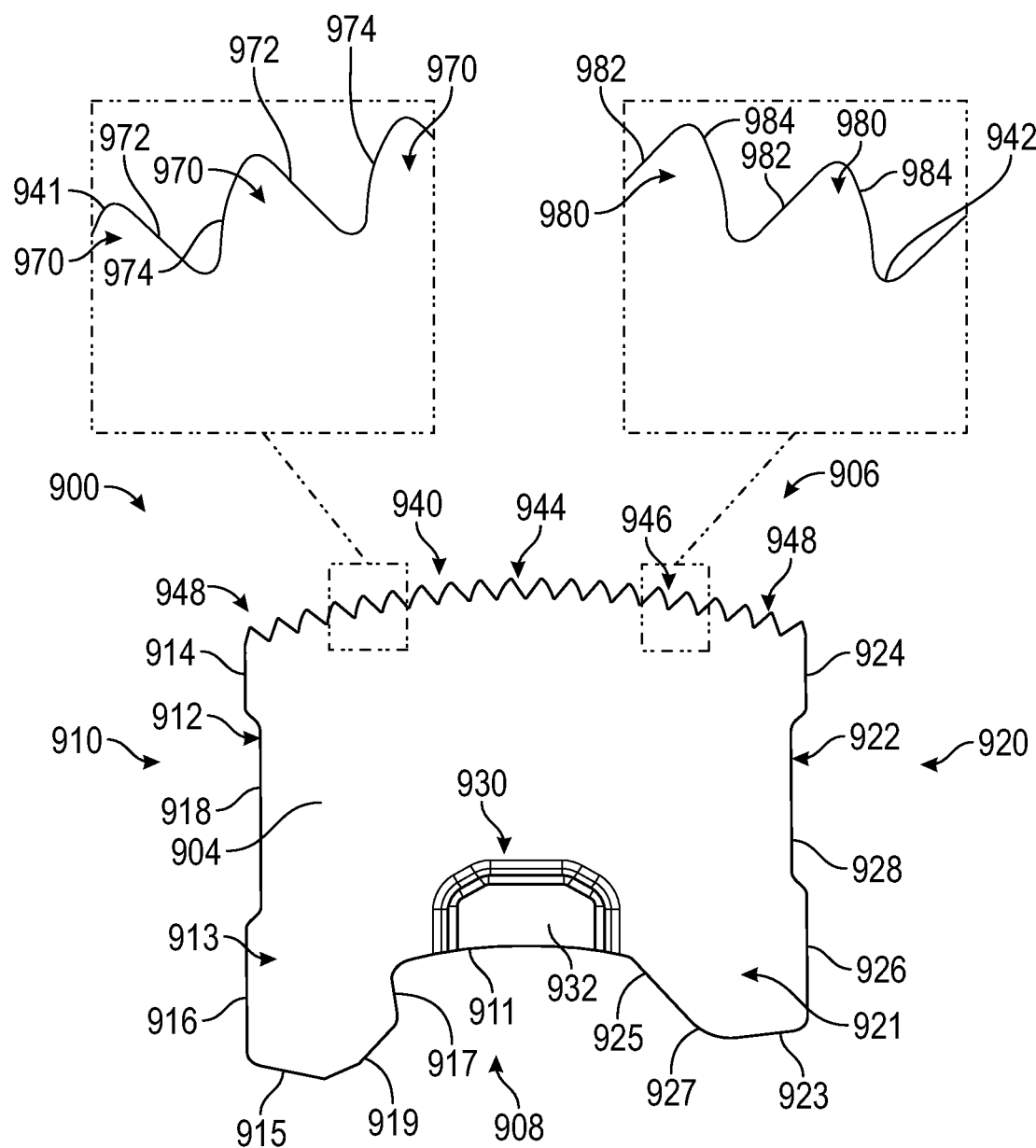
FIG. 34 is a detailed view of intermediate teeth of the pawl of FIG. 25, according to an exemplary embodiment.

As shown in FIG. 34, the intermediate teeth 946 of the pawl 900 include (i) a first plurality of teeth, shown as first intermediate teeth 970, positioned on a first side of the center line 901 and a second plurality of teeth, shown as second intermediate teeth 980, positioned on an opposing second side of the center line 901. The first intermediate teeth 970 have first surfaces, shown as flat faces 972, and second surfaces, shown as curved faces 974. The second intermediate teeth 980 have first surfaces, shown as flat faces 982, and second surfaces, shown as curved faces 984. The first intermediate teeth 970 are distributed evenly between the middle teeth 944 and the end teeth 948 from the center line 901 towards the first side profile 910. The second intermediate teeth 980 are distributed evenly between the middle teeth 944 and the end teeth 948 from the center line 901 towards the second side profile 920. The flat faces 972 of the first intermediate teeth 970 and the flat faces 982 of the second intermediate teeth 980 face towards the center line 901, while the curved faces 974 of the first intermediate teeth 970 and the curved faces 984 of the second intermediate teeth 980 face away from the center line 901. According to an exemplary embodiment, the first intermediate teeth 970 and the second intermediate teeth 980 of the pawls 900 have equal or approximately equal pitch diameters but different center of pitch diameters. According to an exemplary embodiment, the first intermediate teeth 970 of the pawls 900 include seven individual teeth and the second intermediate teeth 980 of the pawls 900 include seven individual teeth. In other embodiments, (i) the first intermediate teeth 970 of the pawls 900 include more than or less seven individual teeth and/or (ii) the second intermediate teeth 980 of the pawls 900 include more than or less than seven individual teeth.

As shown in FIG. 31, in the locked orientation, the first intermediate teeth 970 and the second intermediate teeth 980 of the pawls 900 engage with the teeth 420 of the tooth plate 400 such that the top land 941 of the intermediate teeth 946 of the pawl 900 interface with the bottom land 426 of the teeth 420 of the tooth plate 400 and the top land 424 of the teeth 420 of the tooth plate 400 interface with the bottom land 942 of the intermediate teeth 946. According to an exemplary embodiment, the flat faces 972 of the first intermediate teeth 970 and the flat faces 982 of the second intermediate teeth 980 of the pawls 900 do not engage with (under normal loading conditions) a corresponding side face 428 of the teeth 420 of the tooth plate 400 with which the first intermediate teeth 970 and the second intermediate teeth 980 interface, while the curved faces 974 of the first intermediate teeth 970 and the curved faces 984 of the second intermediate teeth 980 of the pawls 900 engage with and contact a corresponding side face 428 of the teeth 420 of the tooth plate 400 with which the first intermediate teeth 970 and the second intermediate teeth 980 interface.

According to an exemplary embodiment, (i) the structure of the middle teeth 944 and the intermediate teeth 946 and (ii) the type of engagement thereof with the teeth 420 of the tooth plate 400 (a) allows the pawls 900 to tilt as needed and engage as much as available with the tooth plate 400 (e.g., which can remove free play in the recliner assembly 200) and (b) provides a smooth engagement between the pawls 900 and the tooth plate 400 as the pawls transition between the expanded position and the retracted position. Further, the curved faces create line-to-face contact instead of face-to-face contact to reduce friction and improve recliner operation, as well as the optimized pitch diameter center coordinate keeps the same engagement when the pawls 900 are tilted in either direction and improves load capacity in both directions (forward and rearward).

More specifically, the flat face 952 of the first middle tooth 950, the curved face 954 of the first middle tooth 950, the flat face 962 of the second middle tooth 960, the curved face 964 of the second middle tooth 960, the flat faces 972 of the first intermediate teeth 970, the curved faces 974 of the first intermediate teeth 970, the flat faces 982 of the second intermediate teeth 980, and the curved faces 984 of the second intermediate teeth 980 provide (i) a tilt tolerance for the tooth plate 400, where the tooth plate 400 can rotate relative to the pawls 900 in order to couple (engage) the middle teeth 944 of the pawls 900 to the teeth 420 of the tooth plate 400 and the intermediate teeth 946 of the pawls 900 to the teeth 420 of the tooth plate 400 in the transition from unlocked orientation to locked orientation, (ii) a smooth coupling and uncoupling (engagement and disengagement) of the middle teeth 944 of the pawls 900 to the teeth 420 of the tooth plate 400 and the intermediate teeth 946 of the pawls 900 to the teeth 420 of the tooth plate 400 in the transition (a) from locked orientation to unlocked orientation or (b) from unlocked orientation to locked orientation, and (iii) lesser free space between the middle teeth 944 of the pawls 900 and the teeth 420 of the tooth plate 400 and lesser free space between the intermediate teeth 946 of the pawls 900 and the teeth 420 of the tooth plate 400 that makes the coupling stronger (tighter) and eliminates (a) free play between the middle teeth 944 of the pawls 900 and the teeth 420 of the tooth plate 400 and (b) free play between the intermediate teeth 946 of the pawls 900 and the teeth 420 of the tooth plate 400.

Pawl—End Teeth

Figure 35:
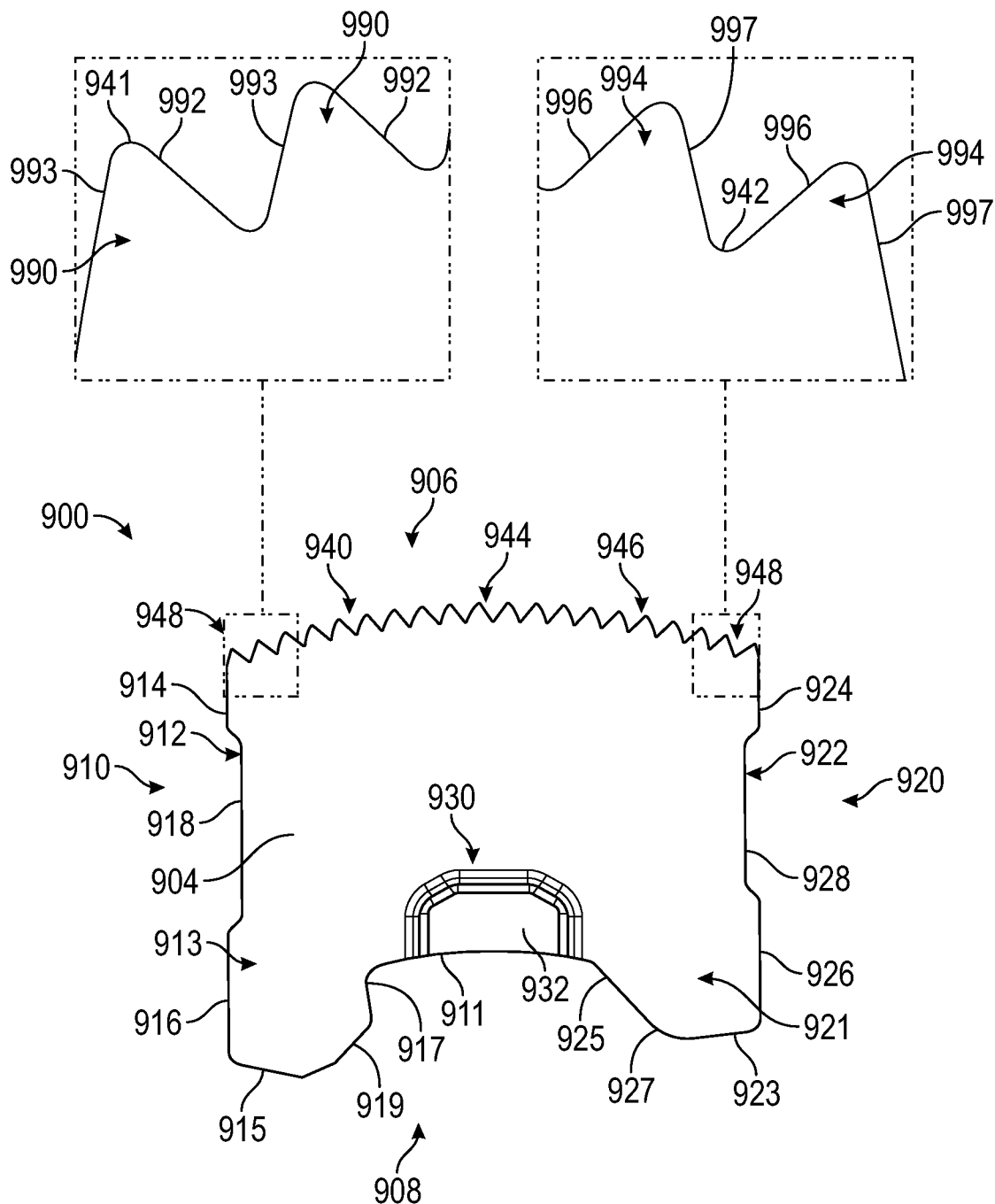
FIG. 35 is a detailed view of end teeth of the pawl of FIG. 25, according to an exemplary embodiment.
Figure 36:
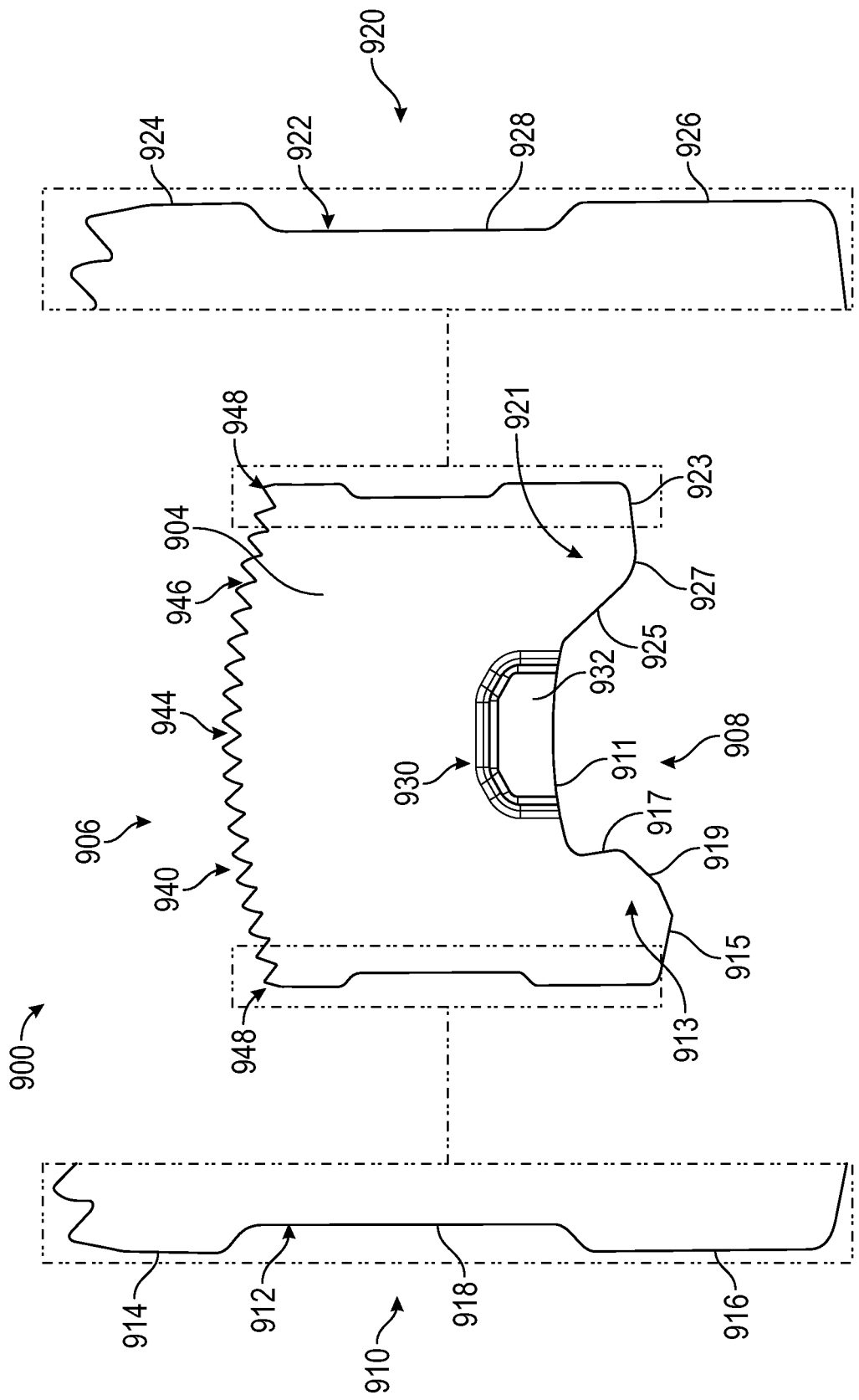
FIG. 36 is a detailed view of side profiles of the pawl of FIG. 25, according to an exemplary embodiment.

As shown in FIG. 35, the end teeth 948 of the pawl 900 include (i) a first plurality of teeth, shown as first end teeth 990, positioned proximate the first side profile 910 and (ii) a second plurality of teeth, shown as second end teeth 994, positioned proximate the second side profile 920. The first end teeth 990 have first surfaces, shown as first flat faces 992, and second surfaces, shown as second flat faces 993. The second end teeth 994 have first surfaces, shown as first flat faces 996, and second surfaces, shown as second flat faces 997. According to an exemplary embodiment, the first end teeth 990 of the pawls 900 include two individual teeth and the second end teeth 994 of the pawls 900 include two individual teeth. In other embodiments, (i) the first end teeth 990 of the pawls 900 include more than or less than two individual teeth and/or the second end teeth 994 of the pawls 900 include more than or less than two individual teeth.

As shown in FIG. 31, in the locked orientation, the first end teeth 990 and the second end teeth 994 of the pawls 900 interface with the teeth 420 of the tooth plate 400. However, according to an exemplary embodiment, (i) the first flat faces 992 and the second flat faces 993 of the first end teeth 990 and (ii) the first flat faces 996 and the second flat faces 997 of the second end teeth 994 of the pawls 900 do not engage with (under normal loading conditions) corresponding side faces 428 of the teeth 420 of the tooth plate 400 to which the first end teeth 990 and the second end teeth 994 interface with when in the locked orientation.

According to an exemplary embodiment, the non-engagement of the end teeth 948 of the pawls 900 with the teeth 420 of the tooth plate 400 under normal loading conditions provides a smooth coupling and uncoupling (engagement and disengagement) of the first end teeth 990 and the second end teeth 994 of the pawls 900 with the teeth 420 of the tooth plate 400 in the transition from the locked orientation to the unlocked orientation or from the unlocked orientation to the locked orientation by preventing contact, and therefore, reducing friction between (i) the first flat faces 992 and the second flat faces 993 of the first end teeth 990 of the pawls 900 and side faces 428 of the teeth 420 of the tooth plate 400 and (b) the first flat faces 996 and the second flat faces 997 of the second end teeth 994 of the pawls 900 and side faces 428 of the teeth 420 of the tooth plate 400. Such reduction in friction improves or reduces release effort when transitioning between locked and unlocked.

According to an exemplary embodiment, the first flat faces 992 of the first end teeth 990, the second flat faces 993 of the first end teeth 990, the first flat faces 996 of the second end teeth 994, and second flat faces 997 of the second end teeth 994 provide improved locking during a Maximum Material Condition (MMC) (e.g., of the pawls 900, of the tooth plate 400, etc.). By way of example, during a MMC, the first flat faces 992 of the first end teeth 990, the second flat faces 993 of the first end teeth 990, the first flat faces 996 of the second end teeth 994, and the second flat faces 997 of the second end teeth 994 of the pawls 900 may continue to permit engagement of the first end teeth 990 and the second end teeth 994 with the teeth 420 of the tooth plate 400 and eliminate the possibility of a non-locking condition.

When the locking mechanism 220 is in the locked orientation and reclining of the seat 40 is desired, a user can engage the end knob 610 of the shaft 600 (e.g., with a lever, by pressing a button that controls an actuator, etc.) in order to place the locking mechanism 220 in the unlocked orientation. As the end knob 610 is being acted on (e.g., pulled, pushed, rotated, etc.) and the shaft 600 is rotating while acting against the spring 1100, the cam 800 turns with the shaft 600 and begins to release the pawls 900 from their locked orientations or expanded positions. As the cam 800 rotates, the release plate 1000 rotates and pulls back the pawls 900 towards the center of the guide plate 300 and repositioning the pawls 900 into their unlocked orientations or the retracted positions. This mechanism occurs in both locking mechanisms 220 on both sides of the seat 40 through the connecting shaft 210. At this point, the tooth plates 400 are free to rotate relative to the guide plates 300, thereby allowing the seat 40 to recline by having the upper frame 120 rotate relative to the lower frame 140.

As used herein, the term "normal loading conditions" can be interpreted to include at least a condition where the seat 40 is oriented at a selected position without an occupant sitting in the seat 40. Further, as used herein, the term "normal loading conditions" can be interpreted to include at least a condition where an occupant is sitting in the seat 40 without applying any force to the upper frame 120. In addition, as used herein, the term "normal loading conditions" can be interpreted to include at least a condition where an occupant is sitting in the seat 40 and applying an amount of force to the upper frame 120 that would typically be applied by an occupant during standard driving conditions (e.g., not including accident conditions, high braking conditions, high acceleration conditions, etc.).

Some embodiments relate to a locking mechanism for a recliner assembly. The locking mechanism includes a housing, a cam disposed within the housing, and a plurality of pawls disposed within the housing. The housing includes a first plate and a second plate received by the first plate. The second plate includes a peripheral lip having an interior face that defines a plurality of teeth. Each of the plurality of pawls defines a central axis. Each of the plurality of pawls includes a plurality of pawl teeth. The plurality of pawl teeth include a first middle tooth positioned on a first side of the central axis and a second middle tooth positioned on an opposing second side of the central axis. The first middle tooth has a first flat face facing the central axis and a first curved face facing away from the central axis. The second middle tooth has a second flat face facing the central axis and a second curved face facing away from the central axis. The cam is configured to engage with the plurality of pawls to reposition the plurality of pawls from (i) a first position where the plurality of pawls do not engage with the second plate to permit rotation between the first plate and the second plate and (ii) a second position where the plurality of pawls engage with the second plate to prevent rotation between the first plate and the second plate. Under first loading conditions and while the plurality of pawls are in the second position, the first flat face of the first middle tooth and the second flat face of the second middle tooth do not contact corresponding surfaces of the plurality of teeth of the second plate.

Some embodiments relate to seat. The seat includes a frame assembly that includes a first frame portion and a second frame portion. The seat frame assembly further includes a recliner assembly that couples the first frame portion to the second frame portion and facilitates pivoting of the first frame portion relative to the second frame portion. The recliner assembly includes two locking mechanisms and a connecting shaft extending between locking mechanisms and coupling the locking mechanisms to each other. Each locking mechanism includes a housing that includes a first plate and a second plate received by the first plate. The second plate includes a peripheral lip having an interior face that defines a plurality of teeth. Each locking mechanism further includes a cam disposed within the housing and a plurality of pawls disposed within the housing. Each of the plurality of pawls defines a central axis. Each of the plurality of pawls includes a plurality of pawl teeth. The plurality of pawl teeth including a first middle tooth positioned on a first side of the central axis. The first middle tooth having a first flat face facing the central axis and a first curved face facing away from the central axis. The plurality of pawl teeth further including a second middle tooth positioned on an opposing second side of the central axis. The second middle tooth having a second flat face facing the central axis and a second curved face facing away from the central axis. The cam engages with the plurality of pawls to reposition the plurality of pawls from (i) a first position where the plurality of pawls do not engage with the second plate to permit rotation between the first plate and the second plate and (ii) a second position where the plurality of pawls engage with the second plate to prevent rotation between the first plate and the second plate.

Some embodiments relate to locking mechanism for a recliner assembly. The locking mechanism includes a housing, a cam disposed within the housing, and a plurality of pawls disposed within the housing. The housing includes a first portion and a second portion received by the first portion. The second portion includes a peripheral lip having an interior face that defines a plurality of teeth having equal pitch diameters. Each of the plurality of pawls defines a central axis. Each of the plurality of pawls includes a plurality of pawl teeth. The plurality of pawl teeth include a first middle tooth positioned on a first side of the central axis, a second middle tooth positioned on an opposing second side of the central axis, first end teeth positioned on the first side of the central axis, second end teeth positioned on the opposing second side of the central axis, first intermediate teeth positioned between the first middle tooth and the first end teeth, and second intermediate teeth positioned between the second middle tooth and the second end teeth. The first middle tooth has a first flat face facing the central axis and a first curved face facing away from the central axis. The second middle tooth has a second flat face facing the central axis and a second curved face facing away from the central axis. Each of the first end teeth and each of the second end teeth has flat faces. Each of the first intermediate teeth and each of the second intermediate teeth have one flat face and one curved face.

Some embodiments relate to a locking mechanism for a recliner assembly. The locking mechanism includes a housing, a cam disposed within the housing, and a plurality of pawls disposed within the housing. The housing includes a first plate and a second plate received by the first plate. The second plate includes a peripheral lip having an interior face that defines a plurality of teeth. Each of the plurality of pawls include first teeth positioned at opposing ends thereof and second teeth positioned between the first teeth. Each of the first teeth have a first flat face and a second flat face. The first teeth have a different profile than the second teeth. The cam is configured to engage with the plurality of pawls to reposition the plurality of pawls from (i) a first position where the plurality of pawls do not engage with the second plate to permit rotation between the first plate and the second plate and (ii) a second position where the plurality of pawls engage with the second plate to prevent rotation between the first plate and the second plate. Under first loading conditions and while the plurality of pawls are in the second position, the first flat face and the second flat face of each of the first teeth do not contact corresponding surfaces of the plurality of teeth of the second plate.

Some embodiments relate to a seat. The seat includes a frame assembly that includes a first frame portion and a second frame portion. The seat frame assembly further includes a recliner assembly that couples the first frame portion to the second frame portion and facilitates pivoting of the first frame portion relative to the second frame portion. The recliner assembly includes two locking mechanisms and a connecting shaft extending between locking mechanisms and coupling the locking mechanisms to each other. Each locking mechanism includes a housing that includes a first plate and a second plate received by the first plate. The second plate includes a peripheral lip having an interior face that defines a plurality of teeth. Each locking mechanism further includes a cam disposed within the housing and a plurality of pawls disposed within the housing. Each of the plurality of pawls includes first teeth positioned at opposing ends thereof and second teeth positioned between the first teeth. Each of the first teeth have a first flat face and a second flat face. The first teeth have a different profile than the second teeth. The cam engages with the plurality of pawls to reposition the plurality of pawls from (i) a first position where the plurality of pawls do not engage with the second plate to permit rotation between the first plate and the second plate and (ii) a second position where the plurality of pawls engage with the second plate to prevent rotation between the first plate and the second plate.

Some embodiments relate to a locking mechanism for a recliner assembly. The locking mechanism includes a housing that includes a first portion and a second portion received by the first portion. The second portion includes a peripheral lip that has an interior face that defines a plurality of teeth. The locking mechanism further includes a cam disposed within the housing and a plurality of pawls disposed within the housing. Each of the plurality of pawls includes first teeth positioned at opposing ends thereof and second teeth positioned between the first teeth. Each of the first teeth has a first flat face and a second flat face. The first teeth have a different profile than the second teeth. The cam engages with the plurality of pawls to reposition the plurality of pawls from (i) a first position where the plurality of pawls do not engage with the second portion to permit rotation between the first portion and the second plate and (ii) a second position where the plurality of pawls engage with the second portion to prevent rotation between the first portion and the second portion. Under first loading conditions and while the plurality of pawls are in the second position, the first flat face and the second flat face of each of the first teeth do not contact corresponding surfaces of the plurality of teeth of the second portion. Under second, higher loading conditions and while the plurality of pawls are in the second position, at least one of the first flat faces or the second flat faces of the first teeth contact corresponding surfaces of the plurality of teeth of the second portion.

Some embodiments relate to a locking mechanism for a recliner assembly. The locking mechanism includes a housing, a cam disposed within the housing, and a plurality of pawls disposed within the housing. The housing includes a first plate defining a plurality of guide channels and a second plate received by the first plate. The second plate includes a peripheral lip having an interior face that defines a plurality of teeth. Each of the plurality of pawls is positioned within a respective one of the plurality of guide channels. Each of the plurality of pawls defines a plurality of pawl teeth. Each of the plurality of pawls has a first side profile defining a first notch and a second side profile defining a second notch. The cam is configured to engage with the plurality of pawls to translate the plurality of pawls along the plurality of guide channels such that the plurality of pawl teeth engage with the plurality of teeth of the second plate. The first notch and the second notch are configured to facilitate deformation of the first side profile and the second side profile, respectively, as at least one of the first side profile or the second side profile engages with a sidewall of a respective guide channel under certain loading conditions to prevent disengagement of the plurality of teeth of the plurality of pawls from the plurality of teeth of the second plate.

Some embodiments relate to a seat. The seat includes a frame assembly that includes a first frame portion and a second frame portion. The seat frame assembly further includes a recliner assembly that couples the first frame portion to the second frame portion and facilitate pivoting of the first frame portion relative to the second frame portion. The recliner assembly includes two locking mechanisms and a connecting shaft extending between locking mechanisms and coupling the locking mechanisms to each other. Each locking mechanism includes a housing that includes a first plate that defines a plurality of guide channels and a second plate received by the first plate. The second plate includes a peripheral lip having an interior face that defines a plurality of teeth. Each locking mechanism further includes a cam disposed within the housing and a plurality of pawls disposed within the housing. Each of the plurality of pawls positioned within a respective one of the plurality of guide channels. Each of the plurality of pawls defines a plurality of pawl teeth. Each of the plurality of pawls has a first side profile that defines a first notch and a second side profile that defines a second notch. The cam engages with the plurality of pawls to translate the plurality of pawls along the plurality of guide channels such that the plurality of pawl teeth engage with the plurality of teeth of the second plate.

Some embodiments relate to a locking mechanism for a recliner assembly. The locking mechanism includes a housing that includes a first portion that defines a plurality of guide channels and a second portion received by the first portion. The second portion includes a peripheral lip having an interior face that defines a plurality of teeth. The locking mechanism further includes a cam disposed within the housing and a plurality of pawls disposed within the housing. Each of the plurality of pawls is positioned within a respective one of the plurality of guide channels. Each of the plurality of pawls defines a plurality of pawl teeth. Each of the plurality of pawls has (a) a first side profile with a first outer face, a second outer face, and a first inner face positioned between the first outer face and the second outer face such that a first notch is defined thereby and (b) a second side profile with a third outer face, a fourth outer face, and a second inner face positioned between the third outer face and the fourth outer face such that a second notch is defined thereby. The cam engages with the plurality of pawls to reposition the plurality of pawls from (i) a first position where the plurality of pawls do not engage with the second portion to permit rotation between the first portion and the second portion and (ii) a second position where the plurality of pawls engage with the second portion to prevent rotation between the first portion and the second portion. While the plurality of pawls are in the second position, the first notch and the second notch are configured to facilitate deformation of the first side profile and the second side profile, respectively, as at least one of the first side profile or the second side profile engages with a sidewall of a respective guide channel under certain loading conditions.

Some embodiments relate to a locking mechanism for a recliner assembly. The locking mechanism includes a housing, a pawl disposed within the housing, and a cam disposed within the housing. The pawl has a bottom profile including a bottom face, a first protrusion extending from a first end of the bottom face, and a second protrusion extending from an opposing second end of the bottom face. The first protrusion has a different structure than the second protrusion. The cam includes a first lobe and a second lobe. The first lobe has a different structure than the second lobe. The cam is configured to engage with the bottom profile of the pawl to reposition the pawl between a first position and a second position. At least one of the first lobe or the second lobe of the cam is positioned between the first protrusion and the second protrusion of the pawl when the pawl is in the first position. The first lobe of the cam engages the first protrusion of the pawl and the second lobe of the cam engages the second protrusion of the pawl when the pawl is in the second position.

Some embodiments relate to a seat. The seat includes a frame assembly that includes a first frame portion and a second frame portion. The seat frame assembly further includes a recliner assembly that couples the first frame portion to the second frame portion and facilitates pivoting of the first frame portion relative to the second frame portion. The recliner assembly includes two locking mechanisms and a connecting shaft extending between locking mechanisms and coupling the locking mechanisms to each other. Each locking mechanism includes a housing and a pawl disposed within the housing. The pawl has a bottom profile that includes a bottom face, a first protrusion extending from a first end of the bottom face, and a second protrusion extending from an opposing second end of the bottom face. The first protrusion has a different structure than the second protrusion. Each locking mechanism further includes a cam disposed within the housing. The cam includes a first lobe and a second lobe. The first lobe has a different structure than the second lobe. The cam engages with the bottom profile of the pawl to reposition the pawl between a first position and a second position. At least one of the first lobe or the second lobe of the cam is positioned between the first protrusion and the second protrusion of the pawl when the pawl is in the first position. The first lobe of the cam engages the first protrusion of the pawl and the second lobe of the cam engages the second protrusion of the pawl when the pawl is in the second position.

Some embodiments relate to a locking mechanism for a recliner assembly. The locking mechanism includes a housing and a pawl disposed within the housing. The pawl has a bottom profile that includes a bottom face, a first protrusion extending from a first end of the bottom face, and a second protrusion extending from an opposing second end of the bottom face. The first protrusion has a different structure than the second protrusion. The first protrusion has a first size and the second protrusion has a second size smaller than the first size. The locking mechanism further includes a cam disposed within the housing. The cam includes a first lobe and a second lobe. The first lobe has a different structure than the second lobe. The first lobe has a third size and the second lobe has a fourth size larger than the third size. The cam engages with the bottom profile of the pawl to reposition the pawl between a first position and a second position. At least one of the first lobe or the second lobe of the cam is positioned between the first protrusion and the second protrusion of the pawl when the pawl is in the first position. The first lobe of the cam engages the first protrusion of the pawl and the second lobe of the cam engages the second protrusion of the pawl when the pawl is in the second position.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Language such as the phrases "at least one of X, Y, and Z" and "at least one of X, Y, or Z," unless specifically stated otherwise, are understood to convey that an element may be either X; Y; Z; X and Y; X and Z; Y and Z; or X, Y, and Z (i.e., any combination of X, Y, and Z). Thus, such language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the seat 40, the recliner assembly 200, and the components thereof as shown in the various exemplary embodiments is illustrative only. Additionally, any element disclosed in one embodiment may be incorporated or utilized with any other embodiment disclosed herein.

The invention claimed is:

1. A locking mechanism for a recliner assembly, the locking mechanism comprising:
   a plate including a peripheral lip having an interior face that defines a plurality of teeth; and
   a pawl defining a central axis and including a plurality of pawl teeth, the plurality of pawl teeth including:
      a first middle tooth positioned on a first side of the central axis, the first middle tooth having a first flat face facing the central axis and a first curved face facing away from the central axis, wherein the first flat face is separated from the first curved face by a first top land; and
      a second middle tooth positioned on an opposing second side of the central axis, the second middle tooth having a second flat face facing the central axis and a second curved face facing away from the central axis, wherein the second flat face is separated from the second curved face by a second top land;
   wherein the pawl is positionable between (i) a first position where the pawl does not engage with the plate and (ii) a second position where the pawl engages with the plate; and
   wherein, under first loading conditions and while the pawl is in the second position, the first flat face of the first middle tooth and the second flat face of the second middle tooth do not contact corresponding surfaces of the plurality of teeth of the plate.

2. The locking mechanism of claim 1, wherein the first middle tooth and the second middle tooth have equal pitch diameters.

3. The locking mechanism of claim 1, wherein the first middle tooth and the second middle tooth have different center coordinates.

4. The locking mechanism of claim 1, wherein, under the first loading conditions and while the pawl is in the second position, the first curved face of the first middle tooth and the second curved face of the second middle tooth engage with and contact corresponding surfaces of the plurality of teeth of the plate.

5. The locking mechanism of claim 1, wherein, under second, higher loading conditions and while the pawl is in the second position, at least one of the first flat face of the first middle tooth or the second flat face of the second middle tooth contacts a corresponding surface of the plurality of teeth of the plate.

6. The locking mechanism of claim 1, wherein the plurality of teeth of the plate have equal pitch diameters.

7. The locking mechanism of claim 1, wherein each of the plurality of teeth of the plate have flat faces.

8. The locking mechanism of claim 1, further comprising a cam configured to variably engage with a bottom profile of the pawl to reposition the pawl between the first position and the second position.

9. The locking mechanism of claim 1, wherein:
   the plurality of pawl teeth include:
      one or more first end teeth positioned on the first side of the central axis; and
      one or more second end teeth positioned on the opposing second side of the central axis; and
   each of the one or more first end teeth and each of the one or more second end teeth have flat faces.

10. The locking mechanism of claim 9, wherein the one or more first end teeth include a plurality of first end teeth, and wherein the one or more second end teeth include a plurality of second end teeth.

11. The locking mechanism of claim 9, wherein:
   the plurality of pawl teeth include:
      first intermediate teeth positioned between the first middle tooth and the one or more first end teeth; and
      second intermediate teeth positioned between the second middle tooth and the one or more second end teeth; and
   each of the first intermediate teeth and each of the second intermediate teeth have one flat face and one curved face.

12. A seat comprising:
   a frame assembly including a first frame portion and a second frame portion; and
   a recliner assembly configured to facilitate pivoting of the first frame portion relative to the second frame portion, the recliner assembly including:
      a connecting shaft extending between the first frame portion and the second frame portion; and
      at least one locking mechanism coupled to the connecting shaft, the at least one locking mechanism including:
         a plate including a peripheral lip having an interior face that defines a plurality of teeth; and
         a pawl having a plurality of pawl teeth including:
            a first middle tooth positioned on a first side of a central axis of the pawl, the first middle tooth having a first flat face facing the central axis and a first curved face facing away from the central axis, wherein the first flat face is separated from the first curved face by a first top land, and
            a second middle tooth positioned on an opposing second side of the central axis, the second middle tooth having a second flat face facing the central axis and a second curved face facing away from the central axis, wherein the second flat face is separated from the second curved face by a second top land;
         wherein the pawl is positionable between (i) a first position where the pawl does not engage with the plate and (ii) a second position where the pawl engages with the plate.

13. The seat of claim 12, wherein, under first loading conditions and while the pawl is in the second position, (a) the first curved face of the first middle tooth and the second curved face of the second middle tooth engage with and contact corresponding surfaces of the plurality of teeth of the plate and (b) the first flat face of the first middle tooth and the second flat face of the second middle tooth do not contact corresponding surfaces of the plurality of teeth of the plate.

14. The seat of claim 13, wherein, under second, higher loading conditions and while the pawl is in the second position, at least one of the first flat face of the first middle tooth or the second flat face of the second middle tooth contacts a corresponding surface of the plurality of teeth of the plate.

15. The seat of claim 13, wherein each of the plurality of teeth of the plate have flat faces.

16. The seat of claim 12, wherein the plurality of teeth of the plate have equal pitch diameters.

17. The seat of claim 12, wherein:
   the plurality of pawl teeth include:
      one or more first end teeth positioned on the first side of the central axis; and
      one or more second end teeth positioned on the opposing second side of the central axis; and
   each of the one or more first end teeth and each of the one or more second end teeth have flat faces.

18. The seat of claim 17, wherein:
the plurality of pawl teeth include:
- first intermediate teeth positioned between the first middle tooth and the one or more first end teeth; and
- second intermediate teeth positioned between the second middle tooth and the one or more second end teeth; and each of the first intermediate teeth and each of the second intermediate teeth have one flat face and one curved face.

\* \* \* \* \*